(12) United States Patent
Max

(10) Patent No.: US 7,485,222 B2
(45) Date of Patent: Feb. 3, 2009

(54) APPARATUS FOR HYDRATE-BASED DESALINATION USING COMPOUND PERMEABLE RESTRAINT PANELS AND VAPORIZATION-BASED COOLING

(75) Inventor: Michael David Max, St. Pete Beach, FL (US)

(73) Assignee: Marine Desalination Systems, LLC, St. Petersberg, FL (US)

( * ) Notice: Subject to any disclaimer, the term of this patent is extended or adjusted under 35 U.S.C. 154(b) by 0 days.

(21) Appl. No.: 11/797,832

(22) Filed: May 8, 2007

(65) Prior Publication Data

US 2008/0053882 A1    Mar. 6, 2008

Related U.S. Application Data

(63) Continuation of application No. 11/785,033, filed on Apr. 13, 2007.

(60) Provisional application No. 60/811,760, filed on Jun. 8, 2006.

(51) Int. Cl.
    *C02F 1/00* (2006.01)
(52) U.S. Cl. .................. 210/170.11; 62/123; 210/177; 210/185; 210/205
(58) Field of Classification Search .............. 210/177; 62/238.5
    See application file for complete search history.

(56) References Cited

U.S. PATENT DOCUMENTS

| | | | |
|---|---|---|---|
| 3,027,320 A | 3/1962 | Buchanan | |
| 3,132,096 A | 5/1964 | Walton | |
| 4,624,747 A | 11/1986 | el Din Nasser | |
| 5,362,467 A | 11/1994 | Sakai | |
| 5,553,456 A | 9/1996 | McCormack | |
| 5,873,262 A | 2/1999 | Max et al. | |
| 6,158,239 A | 12/2000 | Max et al. | |
| 6,475,460 B1 | 11/2002 | Max | |
| 6,497,794 B1 | 12/2002 | Max | |
| 6,673,249 B2 | 1/2004 | Max | |

(Continued)

FOREIGN PATENT DOCUMENTS

GB    1138377    1/1969

(Continued)

OTHER PUBLICATIONS

N.H. Duc et al., "CO2 Capture by Hydrate Crystallization—A Potential Solution for Gas Emission of Steelmaking Industry," Energy Conversion and Management 48 (2007), 1313-22.

*Primary Examiner*—Peter A Hruskoci
(74) *Attorney, Agent, or Firm*—Novak, Druce & Quigg, LLP; Kenneth M. Fagin

(57) ABSTRACT

Desalination apparatus based on porous restraint panels fabricated from a number of different layers of metal, thermoplastic, or other substances are used as sophisticated heat exchangers to control the growth of gas hydrate. The gas hydrate is produced after infusion of liquid hydrate-forming material into water to be treated, which liquid hydrate-forming material can also be used to carry out all the refrigeration necessary to cool seawater to near the point of hydrate formation and to cool the porous restraint panels. Hydrate forms on and dissociates through the porous restraints. The composite restraint panels can also be used in gaseous atmospheres where, for instance, it is desired to remove dissolved water.

9 Claims, 31 Drawing Sheets

U.S. PATENT DOCUMENTS

| | | |
|---|---|---|
| 6,767,471 B2 | 7/2004 | Max |
| 6,890,444 B1 | 5/2005 | Max |
| 6,969,467 B1 | 11/2005 | Max et al. |
| 7,008,544 B2 | 3/2006 | Max |
| 7,013,673 B2 | 3/2006 | Max |
| 7,094,341 B2 | 8/2006 | Max |
| 2003/0209492 A1 | 11/2003 | Max |

FOREIGN PATENT DOCUMENTS

| | | |
|---|---|---|
| WO | WO 2001/010541 | 2/2001 |

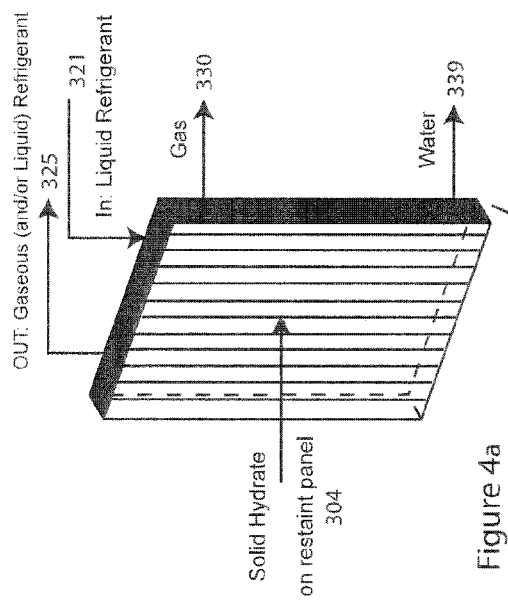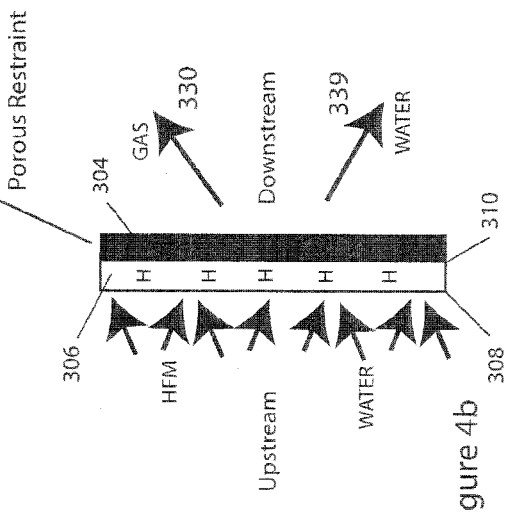
Figure 4a
Figure 4b

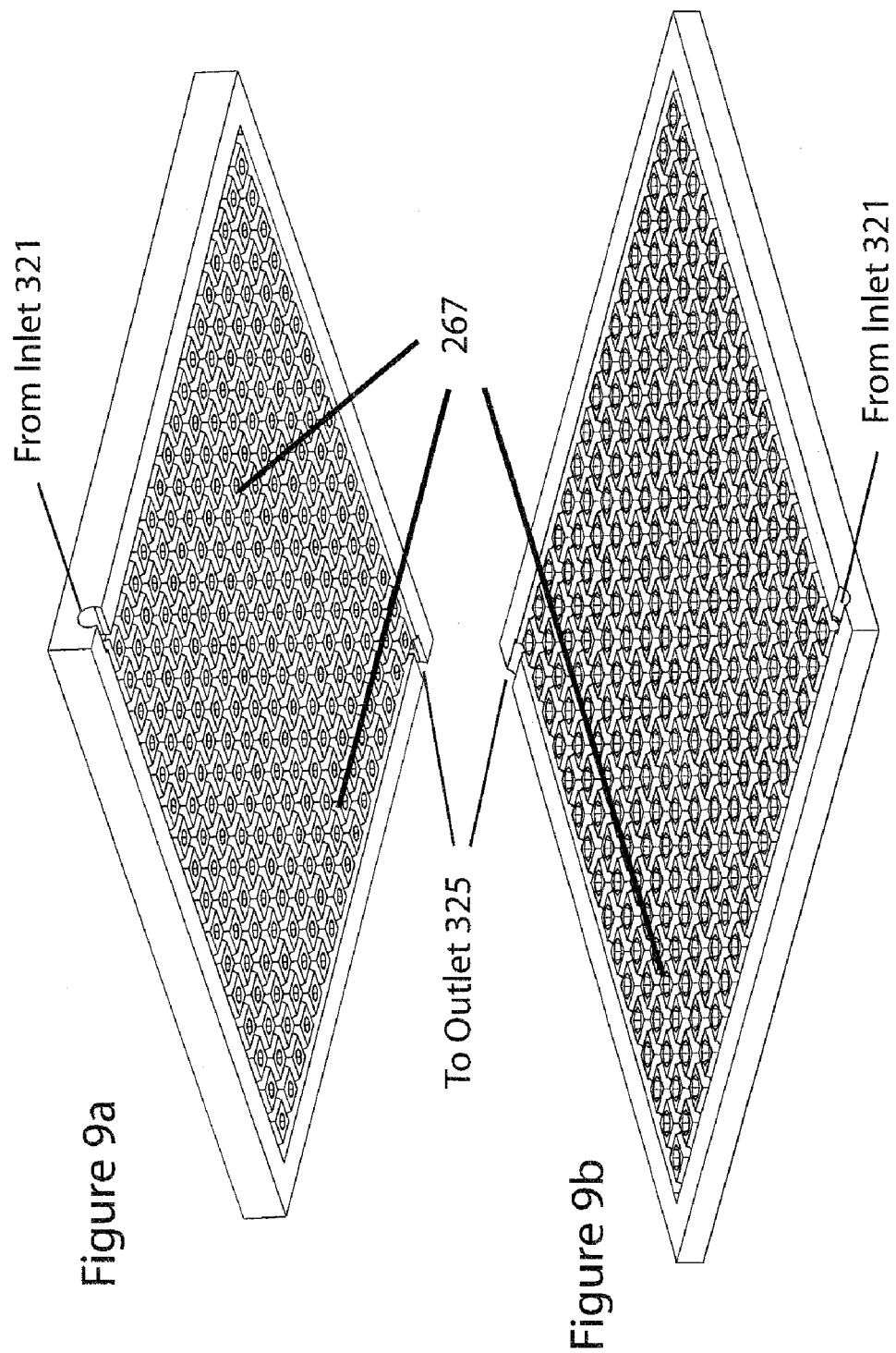

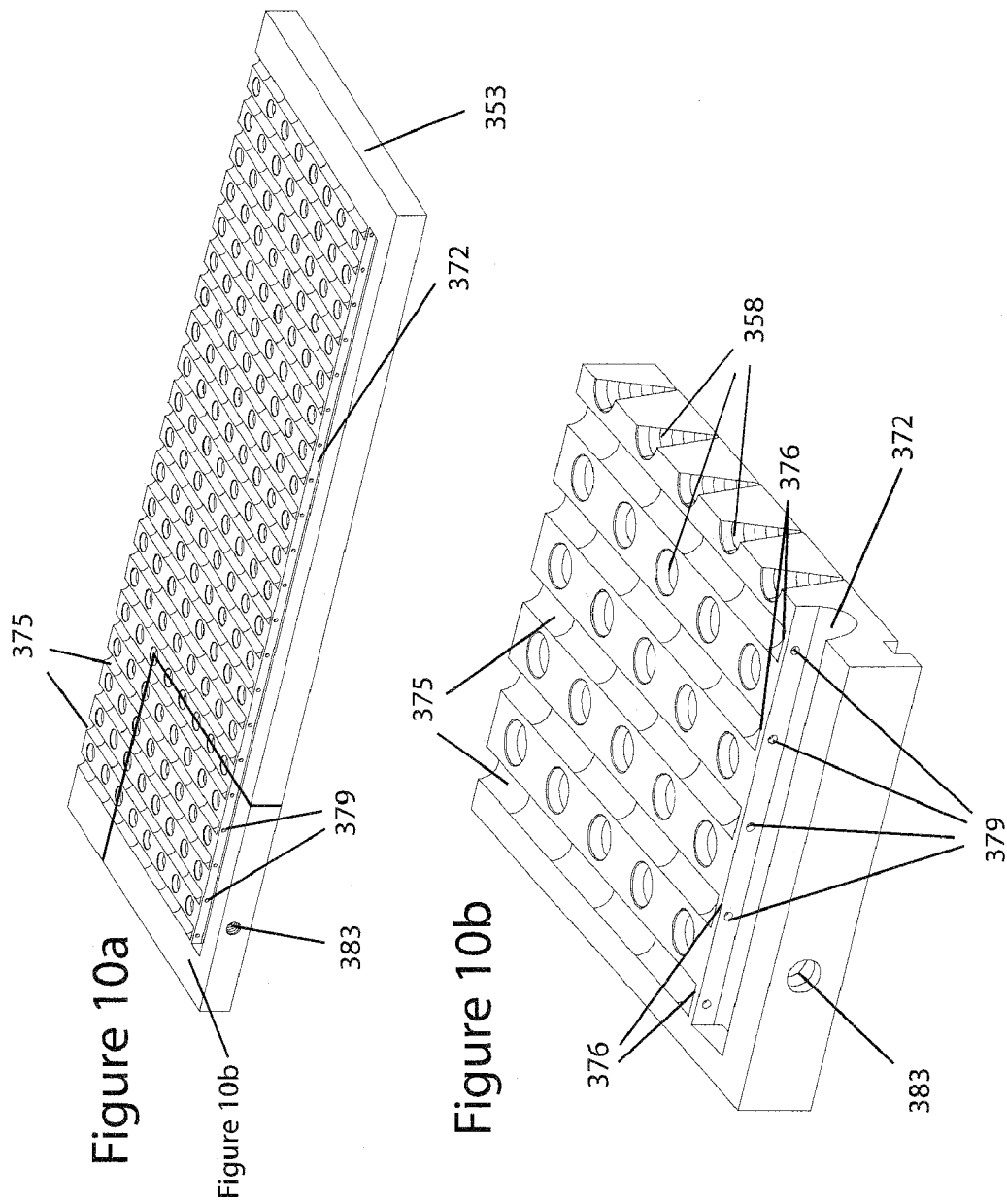

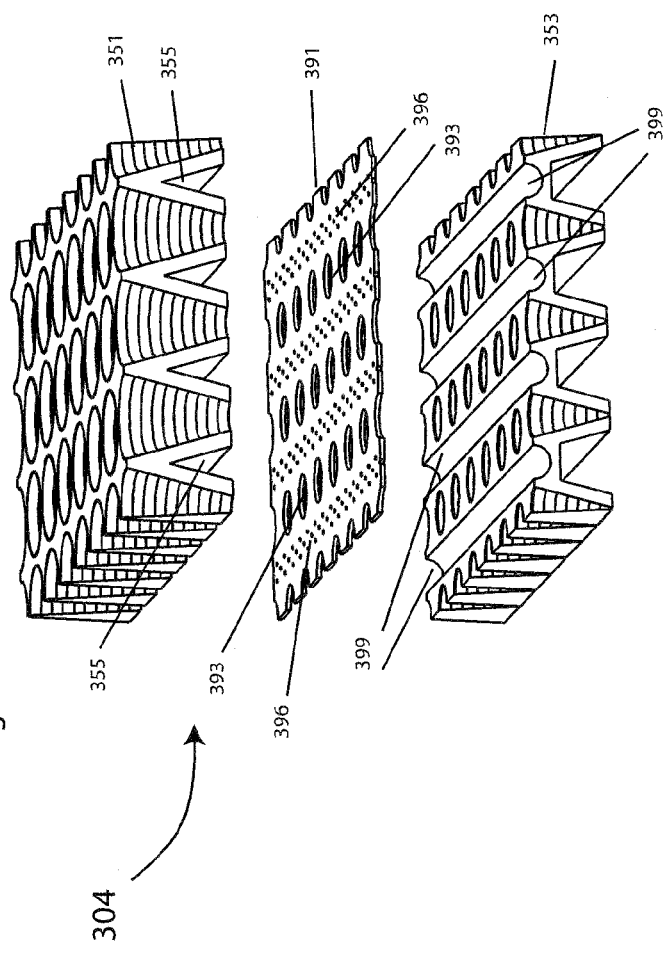
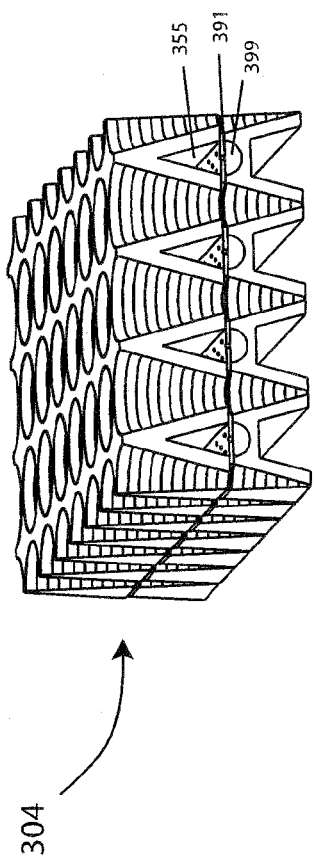
Figure 11a
Figure 11b

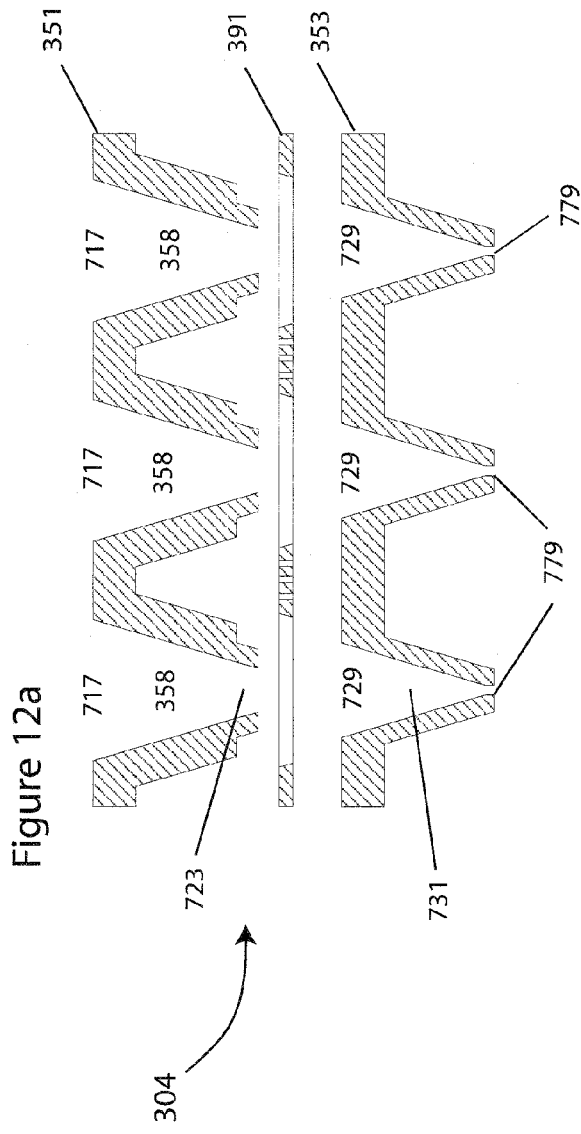
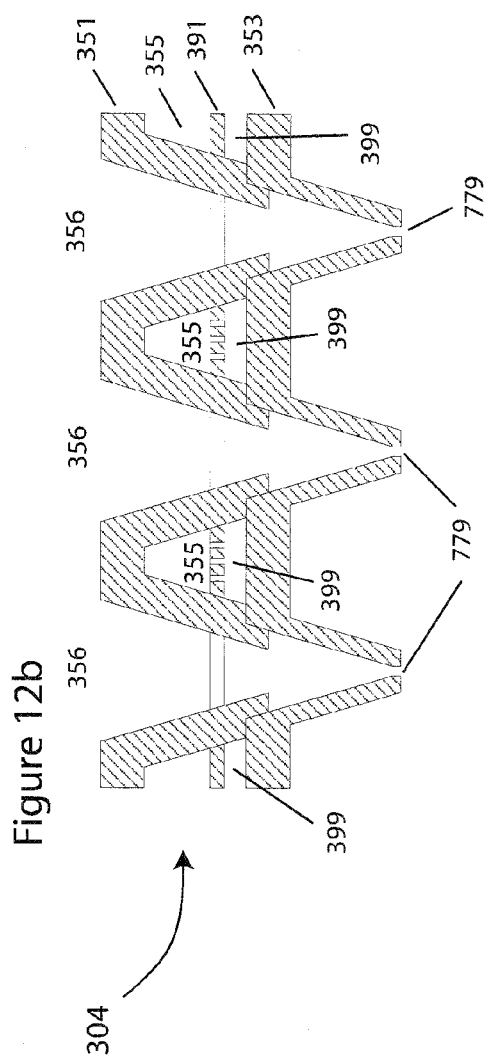
Figure 12a
Figure 12b

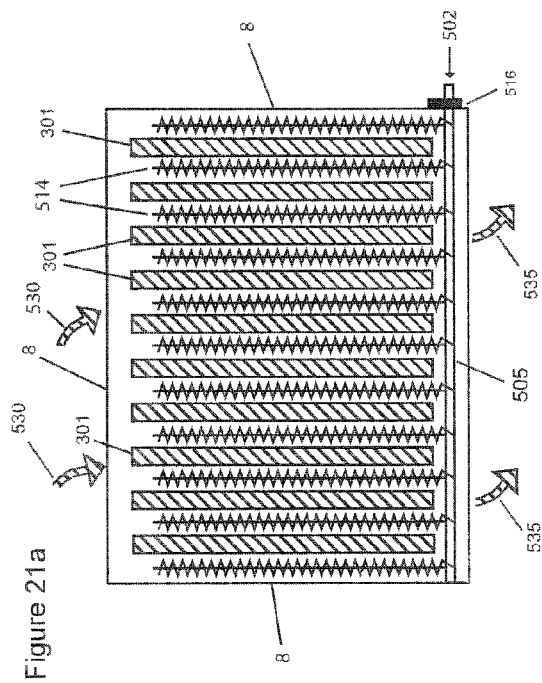
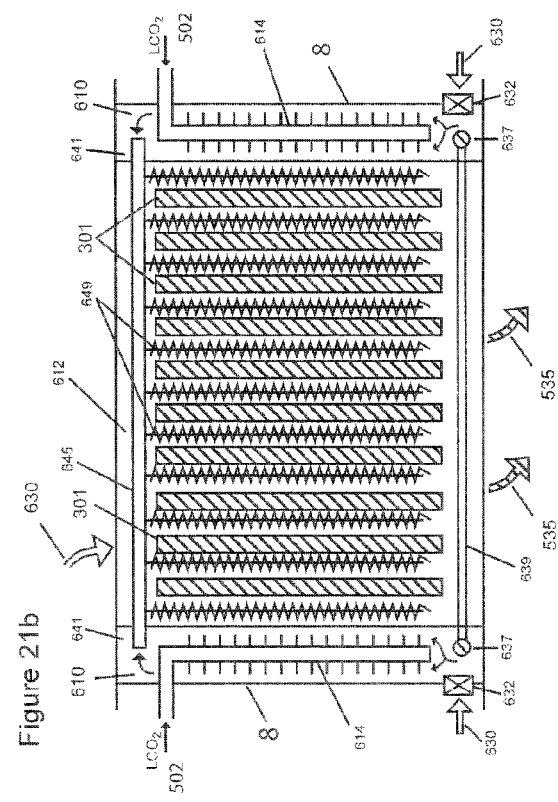

APPARATUS FOR HYDRATE-BASED DESALINATION USING COMPOUND PERMEABLE RESTRAINT PANELS AND VAPORIZATION-BASED COOLING

CROSS REFERENCE TO RELATED APPLICATIONS

This application is a continuation of application Ser. No. 11/785,033 filed Apr. 13, 2007, the contents of which are incorporated by reference. That application is based on and claims the priority benefit of U.S. provisional application 60/811,760 filed Jun. 8, 2006, the contents of which are also incorporated herein by reference.

GOVERNMENTAL SUPPORT AND INTEREST

This invention was made with Governmental support under ONR CONTRACT: N00014-04-C-0237 dated Jun. 4, 2004, and amended May 18, 2005, and issued by the Office of Naval Research. The Government has certain rights in the invention.

FIELD OF THE INVENTION

In general, the invention relates to desalination and water treatment/purification. More particularly, the invention relates to apparatus and methodologies for permeable restraint-supported hydrate formation and dissociation used to achieve such desalination and water treatment.

BACKGROUND OF THE INVENTION

Gas hydrate forms when a hydrate-forming gas such as methane or any of the hydrocarbon gases, carbon dioxide, or chlorine, amongst others, is introduced into water (or where water vapor is introduced into hydrate-forming gas) to appropriate concentrations under suitable conditions of pressure and temperature and in suitable manner so that hydrate crystal nucleation and growth take place. Hydrate may also be formed when an appropriate hydrate-forming gas and water solution that is at pressures suitable for hydrate formation is chilled. Hydrate growth is not only dependent on sufficient pressures and temperature conditions; proper levels of concentration of the dissolved hydrate-forming materials (HFM's) must also be maintained.

So far as is known to me, previous attempts by others to use hydrate for seawater desalination and water treatment, which attempts introduced gas directly into the water to be treated (henceforth referred to as seawater, although other water may be treated), always ultimately resulted in the production of a slurry formed from tiny shards of relatively pure hydrate. (The shards were formed when hydrate shells formed around HFM gas bubbles would fracture.) Thus far, it has not been possible to purify such slurries sufficiently for the direct injection of HFM into seawater to be a viable process for commercially producing fresh water because too much low-salinity water had to be consumed washing the slurry.

In contrast, growth of larger masses of solid hydrate as described in U.S. Pat. No. 6,890,444, which facilitates separation of the hydrate and the residual, enhanced-salinity water, requires that HFM concentration as well as pressure and temperature in the water mass in which it is desired to nucleate and grow hydrate be maintained at appropriate levels. Published hydrate growth models and experimentation that have been described in Chapter 2 of Max et al., "Economic Geology of Natural Gas Hydrate," Springer, Berlin, Dordrecht, 2006, demonstrate that growth of solid hydrate can be best achieved by maintaining an appropriately high concentration of HFM dissolved in water and then lowering temperature. Seawater desalination, for instance, can take place where a metered supply of dissolved HFM can be brought into the presence of hydrate in a seawater matrix, as is described in U.S. Pat. No. 6,890,444, and where pressure/temperature conditions remain suitable for hydrate growth, even where such suitable conditions are very localized.

As taught in U.S. Pat. Nos. 7,008,544 and 7,013,673, the contents of which are incorporated by reference in their entirety, gas hydrate can be induced to form in an oceanic or artificially pressurized environment in which pressure and HFM concentration are suitable for hydrate to form but in which temperature is generally too high for it to do so. In particular, within environments such as these, hydrate can be induced to form on a surface (also referred to as a "restraint") by chilling the surface so that the pressure and temperature conditions for forming hydrate are produced locally on and near the surface. The surface may have pores or penetrations which constitute porosity of the restraint. Hydrate will grow on and outwardly away from the surface when the chilled surface is immersed in a body of water under suitable pressure and having appropriate concentrations of hydrate-forming material (HFM) dissolved therein (or in a gaseous atmosphere of HFM with appropriate concentrations of water vapor dissolved therein). Lowering temperature of the chilled surface causes hydrate to form on it and in its vicinity, thus filling the pores and blocking permeability.

In such processes, hydrate growth takes place through mass transfer of reactants from the region of hydrate instability to the narrow region of hydrate stability near the chilled porous restraint. The hydrate growth front advances into the water (or gas in the case of a gaseous atmosphere) and away from the porous restraint as water immediately at the hydrate face is cooled to the point at which hydrate is stable. Growth is sustained by the chilling of the porous restraint, which compensates for the heat of exothermic crystallization of the hydrate.

Sealing the pores of the restraint allows a pressure differential to be established and maintained across the restraint. In particular, lowering the pressure of the environment on the side of the restraint across from the hydrate (the "downstream" side) causes the hydrate closest to the porous restraint to dissociate or melt, which allows water and gas that have been contained in the solid hydrate crystal lattice to pass through the restraint into a collection region where they separate. The water derived in this process is low in salinity and is collected and concentrated for use. The process of water desalination through hydrate formation/dissociation can be steady-state, in which case hydrate growth and dissociation proceed simultaneously and at about the same rate, or cyclic, in which case there are alternating periods of predominantly hydrate growth or predominantly hydrate dissociation.

SUMMARY OF THE INVENTION

The present invention significantly improves on the methodologies and apparatus taught in my previous, above-reference patents In one aspect, the invention features a method for desalinating or otherwise purifying water to be treated using a hydrate-forming material. The method includes introducing water to be treated into an enclosure containing one or more Hydrate Asymmetric Restraint Technology ("HART") modules. Each of the HART modules includes one or more HART restraint panels, with pores extending from one major surface of the restraint panel to an opposite major surface of the restraint panel, and an internal chamber. In a first cooling process, the water to be treated generally within the enclosure is cooled to a temperature that is slightly above a temperature at which hydrate of the HFM would form at pressure conditions existing within the enclosure; this first cooling process is effected by introducing HFM into the water to be treated within the enclosure. In a second cooling process, water to be treated that is generally adjacent to the HART restraint panels is cooled to a temperature at which hydrate of the HFM forms at the pressure conditions existing within the enclosure; this second cooling process is effected by refrigerating the HART restraint panels. As a result, hydrate of the HFM forms within the pores of the HART restraint panels, with sufficient hydrate being formed to fill and essentially seal the pores of the HART restraint panels. Downstream portions of the hydrate within the pores of the HART restraint panels are caused to dissociate, thereby releasing purified water and HFM into the internal chambers of the HART modules, and the purified water is removed from the enclosure.

In specific embodiments, the enclosure may be located at depth within a body of water, with the pressure conditions within the enclosure being created by the weight of water above the enclosure. In such case, the HFM may be delivered to the enclosure in liquid form by allowing it to flow from a self-pressurizing surface-level supply of HFM to the enclosure. Alternatively, the enclosure may be a pressure vessel, in which case the pressure conditions within the enclosure may be created by pumping and/or vaporization of liquid-form HFM as it is introduced into the water to be treated.

Furthermore, compressed, ordinarily gaseous HFM may be introduced into the water to be treated in liquid form, in which case the first cooling process occurs as the HFM vaporizes and expands within the water to be treated. Alternatively, gaseous HFM may be introduced into the water to be treated, in which case the first cooling process can occur as the HFM expands within the water to be treated (although such cooling will be to a lesser extent than that which occurs when liquid-form HFM vaporizes and expands within the water to be treated). Ideally, sufficient amounts of HFM are introduced into the water to be treated to establish and maintain saturation levels of HFM within the water to be treated within the enclosure.

Regarding the second cooling process, the HART restraint panels may be refrigerated by means of cooled liquid refrigerant circulating internally within cooling galleries within the HART restraint panels. Preferably, however, the HART restraint panels may be refrigerated by means of HFM passing internally through cooling galleries within the HART restraint panels. In the latter case, HFM is even more preferably introduced into the cooling galleries in liquid form and vaporizes internally within the HART restraint panels—most preferably across a refrigerant distribution member from liquid HFM supply sides of the cooling galleries to gas sides of the cooling galleries. HFM that has passed internally through the HART restraint panels is suitably recovered and also introduced into the water to be treated.

In addition to HFM that has been used to refrigerate the HART panels, HFM released into the internal chambers of the HART modules may also be recovered and recycled in further cycles of desalination or purification. So, too, may HFM be recovered from the purified water and reused in further cycles of desalination or water purification.

In operation of the method, supplemental water to be treated may be introduced into the enclosure to compensate for the purified water that has been removed from the enclosure and/or to compensate for enhanced salinity residual brine that has been evacuated from the enclosure. The supplemental water to be treated may be introduced into the enclosure on a generally continuous basis (i.e., continuously but at intervals or constantly); alternatively, new water to be treated may be introduced into the enclosure only after residual salinity within the enclosure has reached a predetermined enhanced level of salinity been evacuated.

Preferably, HFM is recovered in gaseous form from within the internal chambers of the HART modules and/or in gaseous form after having been used to refrigerate the HART restraint panels. The recovered gaseous HFM from either or both of these sources may be mixed with (e.g., dissolved into) water to be treated within the enclosure to help maintain saturation levels of HFM within the water to be treated.

In another aspect, the invention features a method for desalinating or otherwise purifying water to be treated using a hydrate-forming material (HFM). The method includes introducing water to be treated into an enclosure containing one or more HART modules—each of the HART modules includes one or more HART restraint panels, with pores extending from one major surface of the restraint panel to an opposite major surface of the restraint panel, and an internal chamber—and HFM is introduced into the water to be treated within the enclosure. Water to be treated that is generally adjacent to the HART restraint panels is cooled to a temperature at which hydrate of the HFM forms at pressure conditions existing within the enclosure; as a result, hydrate of the HFM forms within the pores of the HART restraint panels, with sufficient hydrate being formed to fill and essentially seal the pores of the HART restraint panels. This cooling is effected by refrigerating the HART restraint panels by passing HFM through cooling galleries extending internally throughout the HART restraint panels. Downstream portions of the hydrate within the pores of the HART restraint panels are caused to dissociate, thereby releasing purified water and HFM into the internal chambers of the HART modules, and the purified water is removed from the enclosure.

Specific embodiments of this aspect of the invention may include one or more of the features described above with respect to the first aspect of the invention.

In another aspect, the invention features apparatus for desalinating or otherwise purifying water to be treated. The apparatus includes an enclosure with one or more HART modules disposed therein. Each of the HART modules includes one or more HART restraint panels, with pores extending from one major surface of each restraint panel to an opposite major surface of each restraint panel, and an internal chamber formed therein. Furthermore, each of the HART restraint panels has a series of cooling galleries extending internally throughout it between the pores. A first conduit is arranged to supply hydrate-forming material to the enclosure, and a second conduit is arranged to remove purified water from the internal chambers of the HART modules.

In preferred embodiments, the enclosure may be submersible and configured to be placed in pressure-equalizing communication with ambient, sub-aquatic surroundings. Alternatively, the enclosure may be a pressure vessel.

Preferably, the pores of the HART restraint panels taper non-monotonically, e.g., they may have a bi-cone configuration. Furthermore, to facilitate such geometries, the HART restraint panels are preferably composite restraint panels made from upper and lower restraint panel sections. Even more preferably the HART restraint panels each include a refrigerant distribution member disposed between the upper and lower restraint panel sections, with microporous regions or very tiny (e.g., on the order of about thirty to about eighty microns) holes disposed within the cooling galleries of the HART restraint panels and dividing the cooling galleries into two sub-galleries.

In another aspect, the invention features a method for refrigerating a heat exchange panel. The method includes filling a series of first sub-galleries extending internally throughout the heat exchange panel with liquid refrigerant and vaporizing the liquid refrigerant across a refrigerant distribution member into a series of second sub-galleries extending internally throughout the heat exchange panel.

In yet another aspect, the invention features a heat exchange panel. The heat exchange panel includes an upper panel section joined to a lower panel section, with a series of cooling galleries defined between the upper and lower panel sections and extending internally throughout the heat exchange panel.

In preferred embodiments, the heat exchange panel may be a HART restraint panel, with pores extending through the heat exchange panel from one major surface thereof to an opposite major surface thereof. More preferably, the pores taper non-monotonically, e.g., they may have a bi-cone configuration. Even more preferably, the heat exchange panel may include a refrigerant distribution member which divides the cooling galleries into upper and lower sub-galleries. The refrigerant distribution member may have microporous regions disposed within the cooling galleries, or it may have holes on the order of about thirty to about eighty microns disposed within the cooling galleries.

Furthermore, the heat exchange panel may include a multitude of vortical flow-inducing members—e.g., protrusions or dimples—distributed across a major surface of the panel.

BRIEF DESCRIPTION OF THE DRAWINGS

The invention will now be described in greater detail in connection with the Figures, in which:

FIGS. 4a and 4b are a schematic perspective view and a schematic side view, respectively, of a porous HART restraint panel used, for example, in the HART module of FIGS. 3a and 3b, illustrating the fundamental HART process;

FIGS. 9a and 9b are schematic perspective views of an upper panel section and a lower panel section, respectively, of another embodiment of a composite porous HART restraint panel according to the invention;

FIG. 10a is a schematic perspective view of a portion of a lower panel section of another embodiment of a composite porous HART restraint panel according to the invention, and FIG. 10b is an enlarged view of the upper left portion thereof;

FIGS. 11a and 11b are a schematic exploded view and a schematic perspective view, respectively, of a portion of another embodiment of a porous HART restraint panel according to the invention, including a refrigerant distribution member;

FIGS. 12a and 12b are, respectively, a schematic exploded view and a schematic assembled view—both in section—of a portion of a snap-together embodiment of porous HART restraint panel according to the invention, including a refrigerant distribution member;

FIGS. 21a and 21b are schematic section views of two different embodiments of apparatus according to the invention;

(It should be noted that the various figures are schematic. Accordingly, dimensions and proportions may change between the various figures, even where the same or similar components are shown in the various figures, for best illustration purposes. Accordingly, the text associated with each figure should be consulted for proper understanding of the concept each specific figure is intended to illustrate.)

DETAILED DESCRIPTION OF EMBODIMENTS OF THE INVENTION

Figure 31:
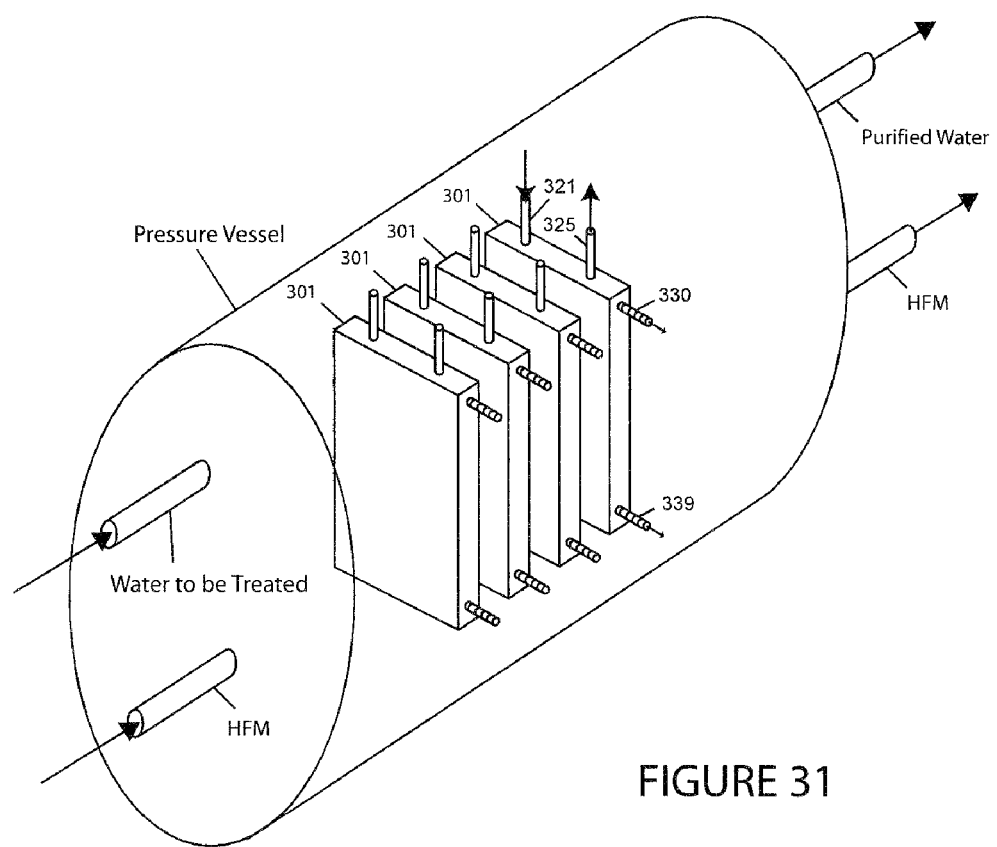
FIG. 31 is a schematic perspective view illustrating a pressure vessel-based embodiment of apparatus according to the invention.

In general, according to the invention, gas hydrate (clathrate) is formed on permeable restraints broadly utilizing the approach of my patents that are referenced above, which restraints are housed within an enclosure. The enclosure may be submerged within a naturally occurring body of water (FIGS. 1 and 2), or it may be an artificially pressurized vessel (FIG. 31). Hydrate-forming material (HFM) is infused into the water being treated, and the permeable restraints are chilled by means of an internal cooling system (illustrated and described in much greater detail below) so that hydrate forms on the surfaces of the permeable restraints. Furthermore, utilizing the approach to desalination taught in my above-referenced patents, the hydrate is caused to dissociate through the permeable restraints, thereby releasing HFM and relatively purified water. The HFM may be captured for further infusion into water being treated, and the purified water is gathered for consumption (possibly after further treatment).

Figure 1:
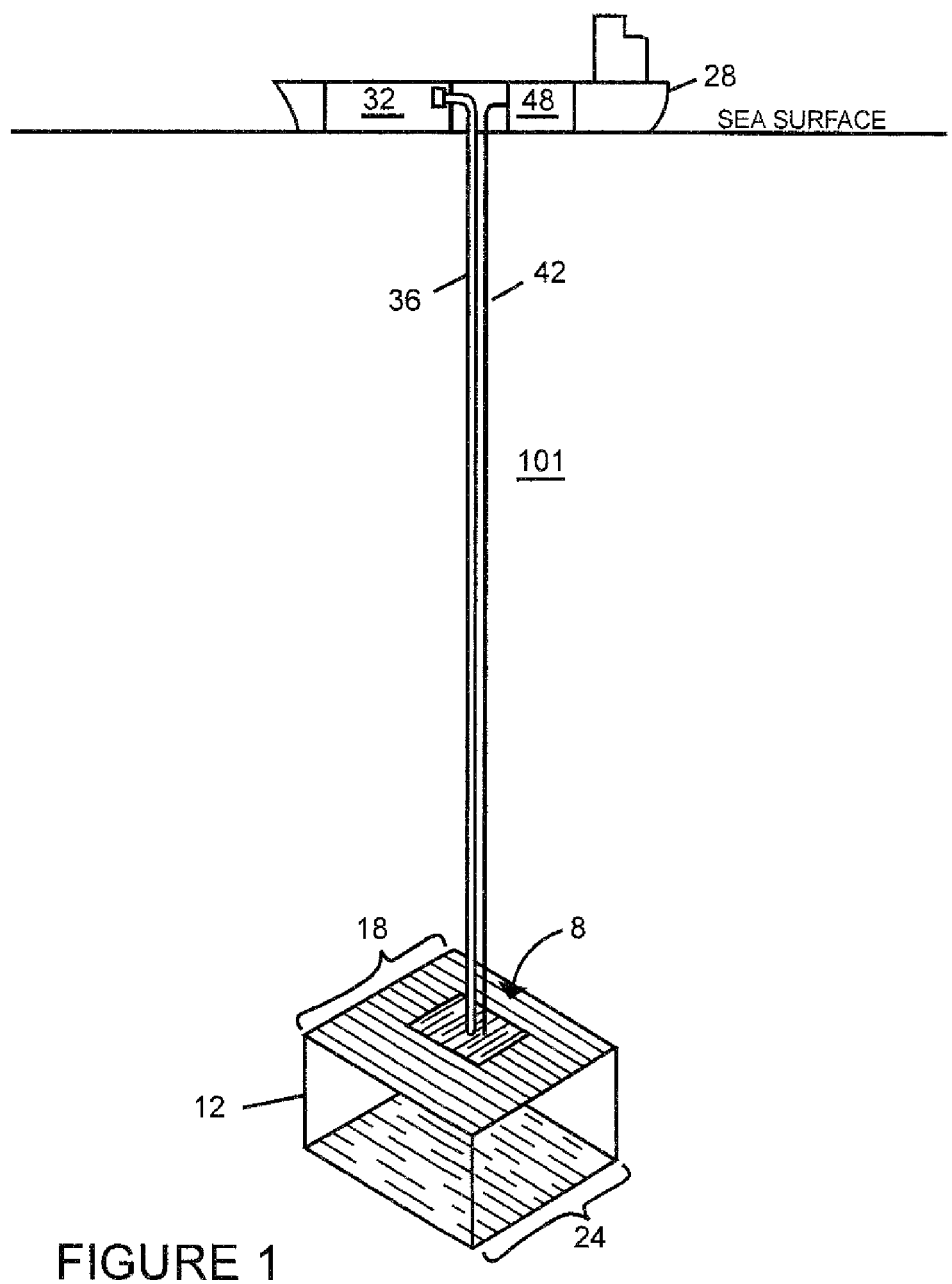
FIG. 1 is a schematic diagram illustrating a submerged, open-ocean embodiment of water purification apparatus according to the invention.

Turning now to the figures, as shown in FIG. 1, in an open, mobile marine installation, apparatus according to the invention is suspended in the sea or other body of water 101. A preferred embodiment of such apparatus is suspended from a floating platform 28 such as a ship, a semi-submersible platform similar to those used in the energy industry, a barge, or other floating platform. The floating platform may be moored, drifting, or slowly underway while the apparatus is deployed beneath it.

The invention includes apparatus for forming localized gas hydrate (which apparatus will be described in detail below) housed within an enclosure 8. (Reference numeral 8 will be used throughout to designate an enclosure in which hydrate forms and desalination takes place, even where the specific embodiments of such an enclosure so designated are slightly different from each other.) The enclosure 8 is essentially solid on its sides 12, but it has openings for the introduction of seawater on its top 18 and for the ejection of residual, enhanced-salinity water on its bottom 24. The openings may be valves or slots, either with preset widths or of variably controlled width, having motorized controls (not shown). The openings in the top and bottom of the enclosure 8 allow water to flow through the enclosure. In a preferred mode of operation, addressed in greater detail below, water movement through the enclosure 8 is driven entirely by gravity. In other modes of operation, water movement may be forced by the use of impellers, propellers, or other means of causing water flow.

The enclosure is connected to the surface by pipes 36, 42. One pipe 36 provides a means for pumping liquid HFM from a tank or tanks 32 on the platform to the enclosure 8, while the other pipe 42 carries low salinity water from the enclosure 8 to another tank 48 in the platform 28. Other connections (not shown) between the surface and the enclosure 8 may include sealed electrical wiring to provide power for sensors, electromechanical controls, communications cables, and provision for hydraulic systems (not shown) such as pumps. Either or both of the pipes can have adequate strength to support the weight of the enclosure, although a separate structural cable (not shown) may be used instead to support the suspended weight. Although the pipes might be assembled from essentially straight segments during immersion of the enclosure 8 into the sea, a preferred embodiment includes flexible pipes that can be unreeled from a winch drum within or on the deck of the ship or platform. Such configuration allows for rapid deployment and initiation of desalination operations. It is also optimal for retrieval of the enclosure for maintenance, cleaning, or extraction in the event of impending severe weather conditions, when the floating platform may need to seek shelter at short notice.

Figure 2:
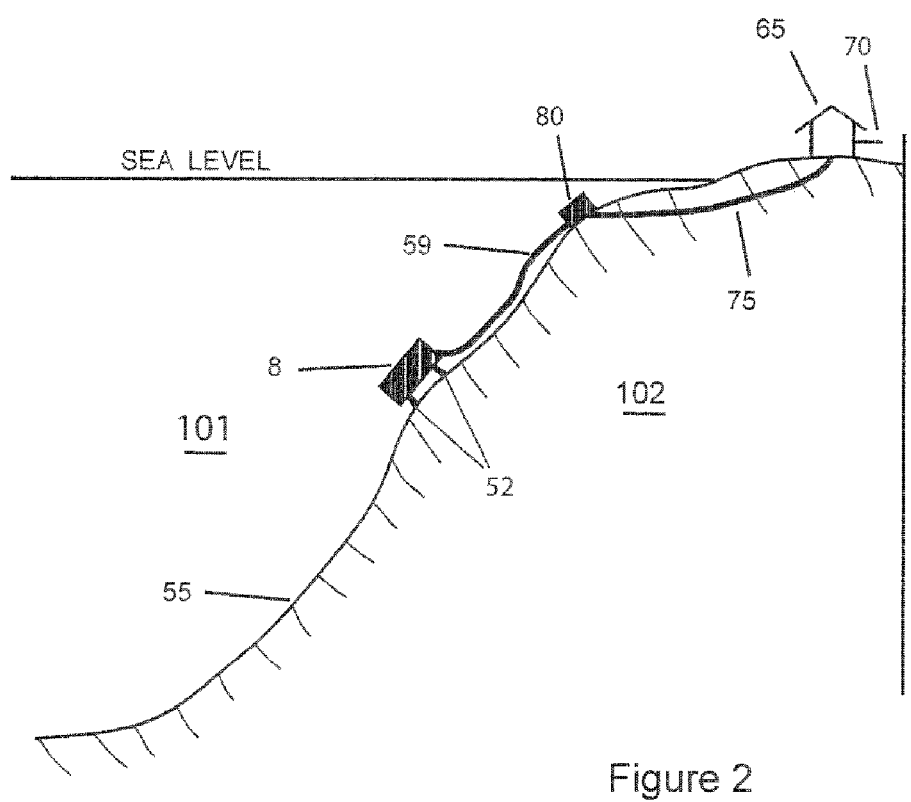
FIG. 2 is a schematic diagram illustrating a submerged, ocean floor-supported embodiment of water purification apparatus according to the invention.

In a fixed marine installation shown in FIG. 2, the enclosure 8 is secured in a mounting 52 (not shown in detail) in seawater 101, affixed to the seafloor adjacent to land 102. In this installation, the HFM supply pipe and the low salinity water delivery pipes (shown as a single line 59) may be rigid or flexible, or a combination thereof. The pipes do not have to have sufficient strength to support the enclosure and/or there is no need for a separate support cable or other apparatus to carry the weight of the enclosure 8 from above. Although it is likely that the enclosure 8 will be installed on a fixed mounting 52, the enclosure 8 could also be installed on a sliding mounting (not illustrated) that would allow the enclosure to be pulled at least partially up and let down the slope 55. This affords flexibility by allowing the installation to be operated at different water depths while still affixed securely to the seafloor.

In the fixed installation, a facility 65 on land for providing the HFM and for receiving the low salinity water normally controls operation of the system and passes the water on 70 to conventional treatment facilities (not shown). Because the pipes and control systems emanating from the land installation can be relatively narrow in cross-section, they can be contained in a laterally drilled hole 75. Such a hole is relatively easy and inexpensive to construct from the facility 65 to a sub-marine junction facility 80, which can be installed on the seafloor below normal wave base for its physical security. Drilling the pipe courses to connect the sub-marine junction facility 80 with the surface installation 65 can be done much less expensively than tunneling.

A fixed installation is more secure than an open, mobile installation because it has a relatively small footprint, and the entire process supply and control apparatus is deeply buried. The fixed marine installation cannot be easily approached or interfered with without substantial diving equipment. Moreover, inclement weather would be much less likely to shut down operation of a fixed installation. Also, operation of a fixed installation would almost certainly require fewer staff— the costs of ships and crews would not be required for a fixed installation—and thus be less expensive, although its capital cost might be greater than a mobile installation's capital cost.

With both the mobile and fixed marine installations, operation of the invention utilizes natural pressurization by disposing the hydrate formation enclosure 8 at a depth in the body of water being treated where pressure is high enough to hydrate to form. Any of the specific embodiments of enclosures 8 and apparatus contained therein may be used in either a mobile or a fixed marine installation.

In either type of installation, the primary purpose of the enclosure 8 is to restrict the flow of water in which the desalination and water treatment apparatus is immersed, thus providing a defined, confined or pseudo-confined volume of water to be treated. Although the enclosure 8 houses and physically protects the actual desalination apparatus, it functions in a manner that is integral to the desalination process of the invention. Because water inside the enclosure 8 is to be cooled according to the invention, as explained in greater detail below, the enclosure may be insulated to some degree to minimize heat transfer from the warmer seawater outside the enclosure to the water being treated within. The size and shape of the enclosure 8 may vary, but it will be generally rectilinear in form (although the external form can be modified to fit any mounting system for either a mobile (FIG. 1) or fixed (FIG. 2) desalination installation).

Further description of the manner in which the enclosure is utilized in the present invention is presented below, along with a more detailed description of other components of apparatus according to the invention.

As explained above in the Background section, in the above-referenced U.S. Pat. Nos. 7,008,544 and 7,013,673, hydrate is formed on (or accumulates against or within) a permeable restraint or support member, and then is caused to dissociate through it from one side of the restraint to the other. I have termed the fundamental technological concept that is the subject of those patents as well as the invention disclosed herein "HART," for Hydrate Asymmetric Restraint Technology.

The restraints that were taught in my previous work—whether planar or contoured—were relatively simple in configuration, providing essentially a permeable plate (whether a flat plate or a curved plate) with continuously tapering pores extending from one surface of the restraint to the opposite surface of the restraint and internal cooling channels extending throughout the restraint (e.g., internally within the restraint) between the pores. The present invention, in contrast, has developed the relatively simple configuration of those HART restraints into a far more sophisticated configuration, which allows the restraints to be used as sophisticated heat exchangers as well as support surfaces on which hydrate forms. In particular, according to this invention, restraint panels are built up from sub-components, and pairs of restraint panels are joined via frames to form enclosed boxes or volumes. I refer to the boxes as "HART modules." A number of HART modules may be joined together within an enclosure 8, as will be described in greater detail below. (Although it is preferable for each HART module to have a pair of restraint panels to maximize the surface area on which hydrate formation and dissociation take place, it is sufficient for purposes of the invention for a HART module to include just one restraint panel.)

Figure 3A:
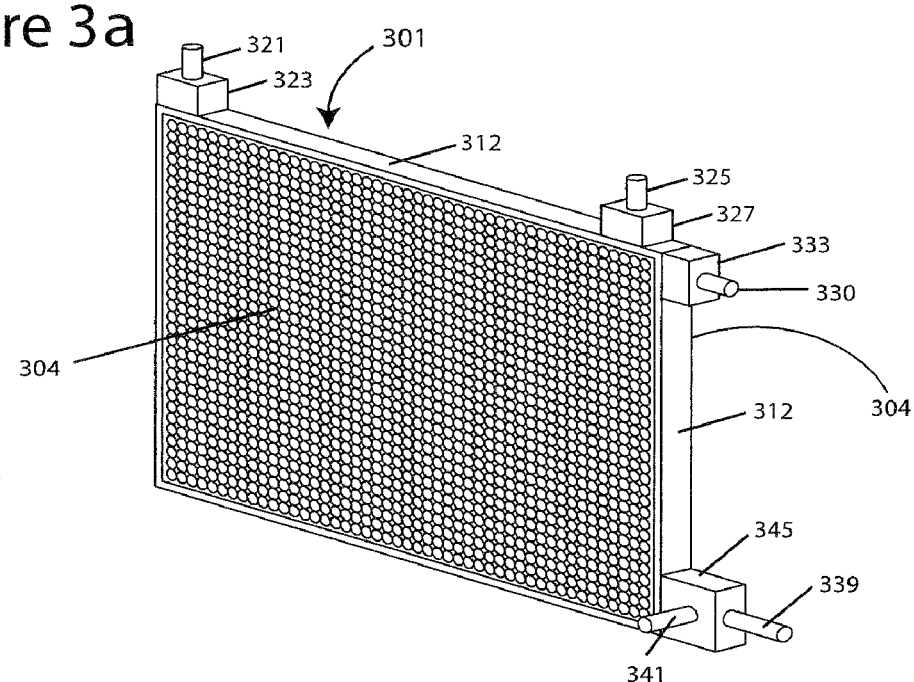
FIGS. 3a and 3b are a schematic perspective view and a schematic exploded view, respectively, of a HART module according to the invention.
Figure 3B:
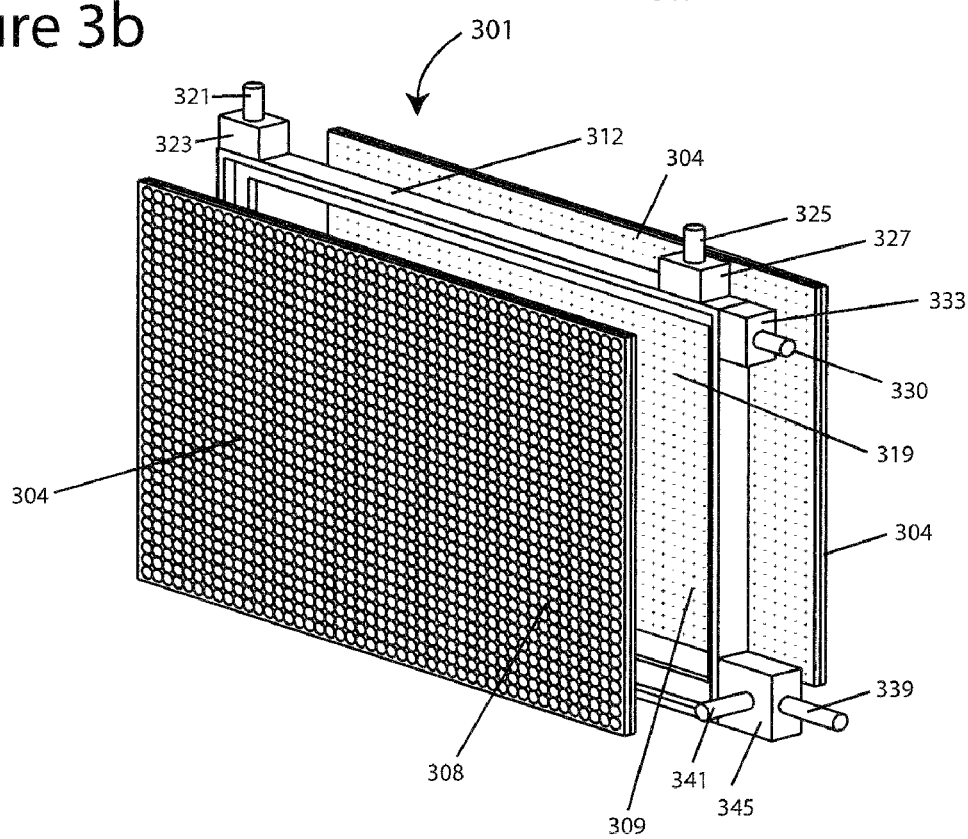

As shown in FIGS. 3a and 3b, a preferred embodiment of a basic HART module 301 may be constructed as a relatively narrow, tabular or box-shaped body with a porous restraint panel 304 forming each of the front and back surfaces (i.e., the major surfaces) of the module 301. (The various embodiments of restraint panels illustrated and described hereinbelow will all be labeled and referred to with reference numeral 301 for convenience and simplicity, even where the specific internal geometries differ slightly in various embodiments.) The porous restraint panels are fitted into a frame 312, and the seams are sealed such that gas and liquid will not pass through the seams. When assembled into the frame, the porous restraint panels may be flush with the frame, as shown in FIG. 3a, or they may be inset or protrude slightly relative to the frame. A narrow chamber 319 is formed inside the frame, between the two porous restraint panels. (See, also, FIG. 17.) The width of the chamber may be fixed by spacers (not shown) that separate the two porous restraint panels when they are fully inserted into respective mounting cutouts in the frame 312. The spacers preferably separate the panels by about no more than one inch (2.54 cm). If the internal chambers have relatively large volume, buoyancy of the HART module—as explained below, there will be gas and liquid inside the chamber (which is submerged in water) during operation of the invention—will vary over a greater range than if they have relatively small volume. Therefore, relatively smaller chamber volumes are preferred to provide more stable, predictable buoyancy characteristics.

Further understanding of the components and operation of the HART modules 301 will be facilitated by a general description of the processes or functions served by the restraint panels 304. Specifically, there are inter-related processes of controlled chilling of the water being treated; localized controlled growth of gas hydrate; and localized dissociation of gas hydrate, so that the water bound in the hydrate may be removed from the region in which it has formed. In general, as illustrated in FIGS. 4a and 4b, solid hydrate 306 (whose position against the restraint panel 304 is indicated schematically by vertical lines in FIG. 4a) is caused to form on one side of a restraint panel 304, namely, its outer surface 308, i.e., the surface of the restraint panel that is exposed to the water being treated. As described in much greater detail below, cooling passages or "galleries" extend internally throughout the restraint panel 304, generally parallel with the outer and inner surfaces 308, 309, to form an internal cooling system. Means for introducing 321 and removing 325 the coolant/refrigerant into and out of the cooling system are also provided. Chilling of the face of the restraint panel, so that localized conditions suitable for hydrate growth, is effected by circulating refrigerant through the cooling system. In a preferred embodiment, the coolant/refrigerant, which most preferably is HFM, enters the restraint panel in liquid form and vaporizes therein to chill the panel; alternatively, liquid refrigerant (e.g., ethylene glycol) that has been thoroughly chilled may be circulated through the cooling system, with the refrigerant both entering and exiting the cooling system in liquid form.

Once solid hydrate 306 has formed on the porous restraint panel, the pores of the restraint panel become clogged with the hydrate. The phase boundary for hydrate grown on the upstream side of the restraint (FIG. 4b) is located near or at the location of contact between the growing hydrate and the water it is growing into, i.e., the hydrate/water interface, and the temperature of the system is lowest at the surface of the porous restraint panel. Because the thermal conductivity of hydrate is low, there is a temperature gradient through the hydrate mass, with temperature normally increasing with distance from the surface of the porous restraint panel. Therefore, hydrate will grow on the upstream side of the porous restraint panel, outwardly into the water being treated, so long as the temperature at the region of contact between hydrate and water is low enough, so long as there is an ample supply of reactants (water and HFM, as indicated on FIG. 4b by arrows in the upstream region), and so long as the water/hydrate interface is within the field of hydrate stability.

Hydrate that fills the pores of the restraint panel is exposed, through the pores, to the pressure conditions of the downstream region and can be maintained at pressures and temperatures that are different from those at the hydrate growth front 308 because the hydrate forms a pressure seal. Therefore, in order to dissociate the hydrate so that its constituent HFM and water can pass through the restraint panel and into the region on the downstream side of the restraint panel, pressure on the downstream side of the restraint panel is lowered. (Additionally, if dissociation proceeds rapidly, heat may have to be added to the local system to prevent the temperature from falling below 0° C., i.e., to prevent water ice from forming.) When pressure in the downstream region is lowered (and temperature is raised, if necessary/desired), the physical conditions for hydrate instability and dissociation can be created. Therefore, a second phase boundary 310 that is subject to different pressure/temperature conditions than those that exist at the hydrate growth front 308 can be established on the hydrate that is adjacent to the surface of or within the pores of the restraint panel. The conditions at this second phase boundary 310 can be maintained so that the inner hydrate surface remains in a condition of instability due to lower pressure to which it is subjected. Thus, by reducing pressure in the narrow chamber 319 within the overall HART module 301, which chamber is the downstream region and which reduced pressure acts on the hydrate through the pores in the restraint panel, the portion of the hydrate that is exposed to that reduced pressure is caused to dissociate back into its constituent HFM 330 (typically in gaseous form) and water 339. That water and HFM pass through the restraint panel 304 and into the chamber within the HART module and are removed from the HART module by means described below. By exposing the hydrate to high pressure (i.e., pressure within the hydrate phase boundary for the temperature of the restraint) on the upstream side and relatively low pressure (i.e., pressure outside the hydrate phase boundary) on the downstream side, hydrate can be formed and dissociated simultaneously on opposing sides of its physical mass.

(Because the water differs in salinity, temperature, and gas content at different points in the processes that are described herein, I refer to it using different terminology according to the point in the process being described. "Seawater" is the source water, regardless of its salinity or gas content. It is the water from which bulk extraction of water molecules is achieved. "Captured water" is that water which has been extracted from the seawater by incorporation into gas hydrate through crystal growth processes. "Converted water" is water that is derived from or released upon the dissociation of hydrate. Converted water may contain some gaseous HFM that has also been released upon dissociation of the hydrate. "Recovered water" refers to water that has separated from the released gaseous HFM and that has been removed to the pipe assembly associated with recovering water from the apparatus. "Produced water" refers to water that has been removed from the desalination apparatus and water recovery pipe assembly and that is available at the surface for further processing and/or transport to market.)

Referring back to FIGS. 3a and 3b, each HART module 301 has four separate ports, two of which (321, 325) are provided for operation of the refrigeration systems of the porous restraint panels and two of which (330, 339) are provided for collection of gas and water released by dissociating hydrate, which gas and water separate naturally. A liquid refrigerant inlet 321 and its control sensors and valves 323 are provided in the frame. Similarly, a refrigerant outlet 325 and control sensors and valves 327 are provided on the frame. The valves 327 are configured for the specific nature of the refrigerant at its exit, viz., gaseous or liquid. The water separation and collection process also requires at least two outlets—one for gas in the upper part of the module and one for water in the lower part of the module. A gas outlet 330 and its control sensors and valves 333 are provided in the upper part of the module frame. A recovered water outlet 339 and control sensors and valves 345 are provided in the lower part of the module frame. Preferably, a water dump valve 341 that is controlled by the valves and sensors 345 is also provided in order to exhaust water that may have become contaminated.

The recovered water outlet 339 of each HART module 301 is connected to a collector system (not illustrated), whereas the water dump outlet 341 allows water to be exhausted before it enters the collector system. Water may be exhausted by increasing gas pressure back in the modules and expelling water, or it may be exhausted by continued production of low salinity water though hydrate formation and dissociation. Each HART module 301 also has provision for dumping water using gas flush by forcing gas into the module through the gas outlet 330 so that water can be expelled, e.g., during startup or if a seawater breach through a pore results in salinity rising to a level beyond that which is acceptable. (Some leakage of untreated seawater into the HART module 301 and mixing with the product water is acceptable, so long as the overall salinity of the recovered water remains below the target product salinity.)

Each HART module 301 further has means for exhausting water using gas flushing so that water can be expelled from the module during system startup or if seawater breaches through a pore and causes salinity to rise to a level within the module that is beyond that which is acceptable. Back-flushing the pores using either liquid or gas (when no hydrate is present) to remove unwanted particulate matter if flow becomes restricted is also possible. (Some suspended and/or dissolved material in the product water is acceptable, so long as the overall salinity of the recovered water remains below the target product salinity.)

Figure 5:
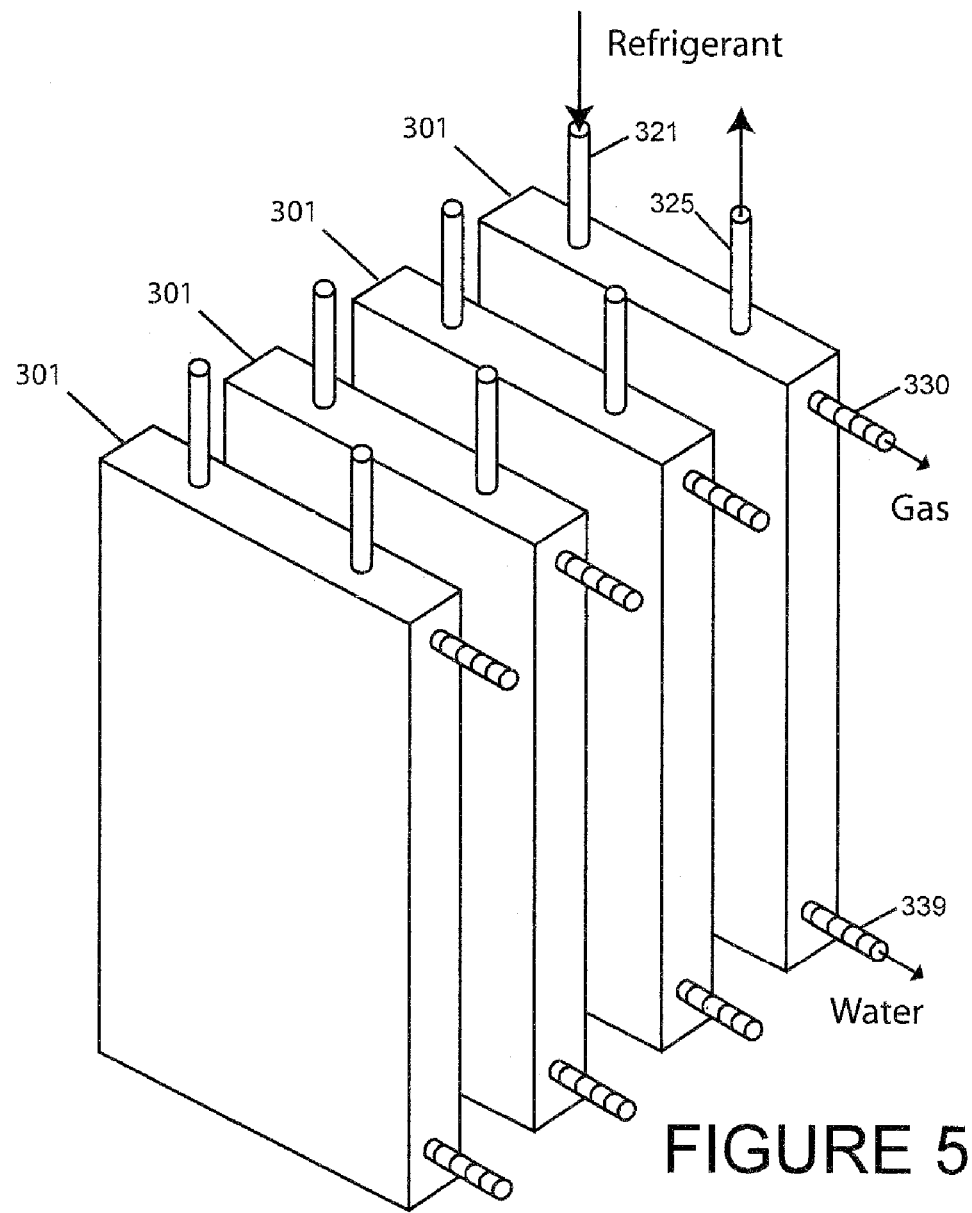
FIG. 5 is a schematic perspective view illustrating an array of HART modules used, for example, in the overall apparatus shown in FIG. 1, FIG. 2, or FIG. 31.

HART modules 301 are configured and arranged to operate in arrays within an enclosure 8. In a preferred arrangement illustrated in FIG. 5, HART modules are placed alongside one another, oriented so that the internal chamber 319 of each module provides the greatest vertical height for separation of gas from water that has been produced by dissociation of gas hydrate through the porous restraint panels. Depending on desired water production, the size of the HART modules, and/or the size of the enclosure 8, there may be more than one row of HART modules arrayed within a given enclosure 8.

Restraints according to the invention (i.e., the porous restraint panels 304) are referred to as "composite" because each is composed of two or more component layers that are fabricated separately and then joined together to make a tapered-pore porous restraint panel, which facilitates low-cost manufacturing, optimal refrigeration, and optimal temperature control. The detailed geometry of the complexly shaped tapered pores will be discussed below, subsequent to more general description of the embodiments and in relation to the process of hydrate formation and dissociation. By fabricating the porous restraint panels in more than one section, complex internal geometries for open cooling channels or "galleries" can be achieved that cannot be practically produced in any other way. These internal galleries can be formed by machining or other cutting process, in which case the restraint panels are referred to as "thick wall" because they must be machined. "Thin wall" composite restraint panels, on the other hand, can be made by stamping, extruding, or some other industrial process such as direct forming of a polymer. Thin wall restraint panels will have thinner tapered pore wall thicknesses and will almost certainly be less expensive to manufacture than thick wall restraint panels. Because both the upper and lower sections of a porous restraint panel according to the invention have a honeycomb structure, even in embodiments that may have very thin walls, the structures have considerable inherent strength.

Figure 6A:
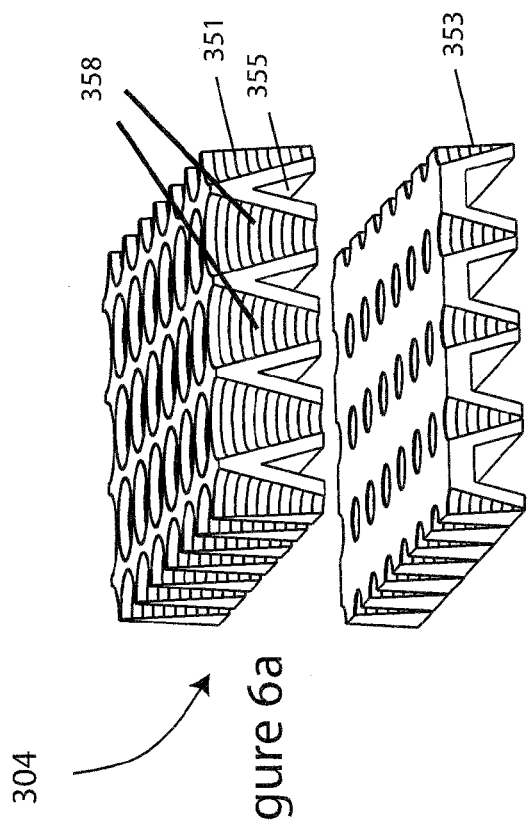
FIGS. 6a and 6b are a schematic exploded view and a schematic perspective view, respectively, of a portion of one embodiment of a porous HART restraint panel according to the invention.
Figure 6B:
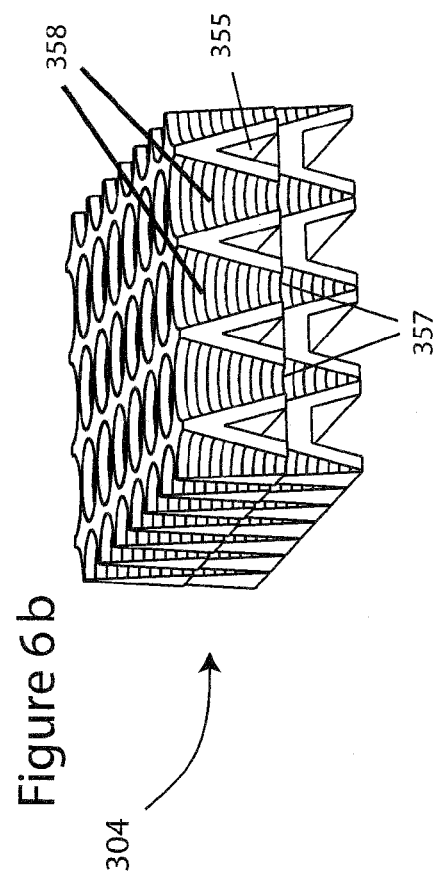

As shown in FIGS. 6a and 6b, the simplest embodiment of a composite porous restraint panel 304 is fabricated in two sections. These two sections include an upper section 351, which faces the water mass being treated, and a lower section 353, the exposed face of which bounds the internal chamber 319 of a HART module 301. (The upper section 351 is upstream with respect to the direction of movement of water in the hydrate desalination process, while the lower section 353 is downstream relative to the water flow through the porous restraint panel.) The upper section 351, in which the hydrate is grown, and the lower section 355, in which dissociation takes place, are joined together and formed into a single unit (FIG. 6b) via glue, resin, brazing or soldering, compression and shear or ultrasonic welding, or other processes known to fabrication industries.

In this embodiment, longitudinally extending refrigerant galleries 355 are located inside of the upper section 351 so as to be internal within the porous restraint panel when the upper and lower sections are assembled together, as shown in FIG. 6b. The refrigerant galleries are isolated from water; therefore, a gasket or sealant (not shown) may be provided between the upper and lower sections to enhance sealing. The refrigerant galleries 355 are shown in FIGS. 6a and 6b as triangular in cross-section for illustration only; it should be appreciated that they might have a cross-sectional shape that does not "follow" the shape of the adjacent surfaces of the tapered pores on the side of the upper section 351 that faces the water under treatment.

Furthermore, both the upper and lower restraint panel sections 351, 353 have a plurality of tapered pores (illustrated by contour lines on the walls of the pores) that are aligned with each other through the composite porous restraint panel. As addressed in more detail below, hydrate forms in the tapered pores in the upper restraint panel section—thus, the pores in the upper restraint panel section constitute hydrate formation regions 358—and, in preferred embodiments of the invention, dissociates in the tapered pores in the lower restraint panel section. Notably, the mouths of the tapered pores in the lower section 353 (i.e., the widest part of the pores) are wider than the outlets (i.e., the lowest parts) of the tapered pores in the upper section 351. This relationship results in a "double cone" profile of the composite tapered pores; in other words, there is a "step" or "jog" in the profiles of the pores at the point 357 where the upper and lower sections 351, 353 are joined together, as is shown in FIG. 6b. Thus, whereas the pores in the porous restraints shown in my earlier patents decrease monotonically in diameter, the overall or composite pores in the composite restraint panels of this invention have a step at the junction between the upper and lower sections, where the diameter of each composite pore expands slightly before decreasing again in the direction from the upper section 351 to the lower section 353. (The benefits of such a configuration will be explained below in connection with a more detailed description of the hydrate formation and dissociation dynamics relating to this invention.)

Figure 7A:
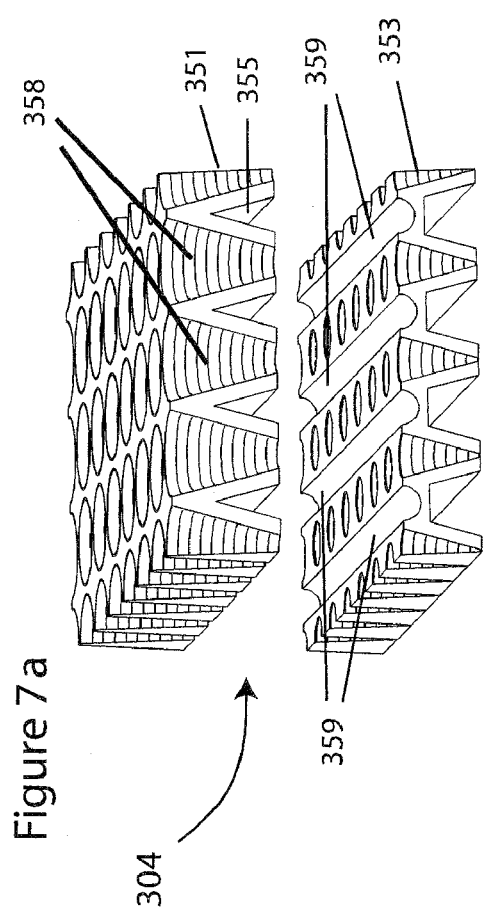
FIGS. 7a and 7b are a schematic exploded view and a schematic perspective view, respectively, of a portion of another embodiment of a porous HART restraint panel according to the invention.
Figure 7B:
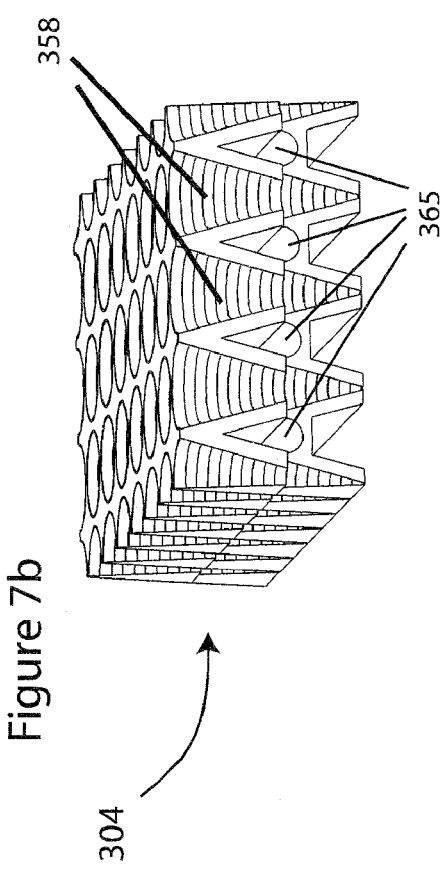

If greater coolant capacity is required, additional longitudinally extending channels 359 can be provided in the lower restraint panel section 353, which correspond to and are aligned with the channels 355 in the upper restraint panel section 351 as shown in FIGS. 7a and 7b. When the two sections are assembled together, the resultant refrigerant galleries 365 are substantially larger than the ones in the embodiment shown in FIGS. 6a and 6b and the chilling potential is enhanced.

Figure 8A:
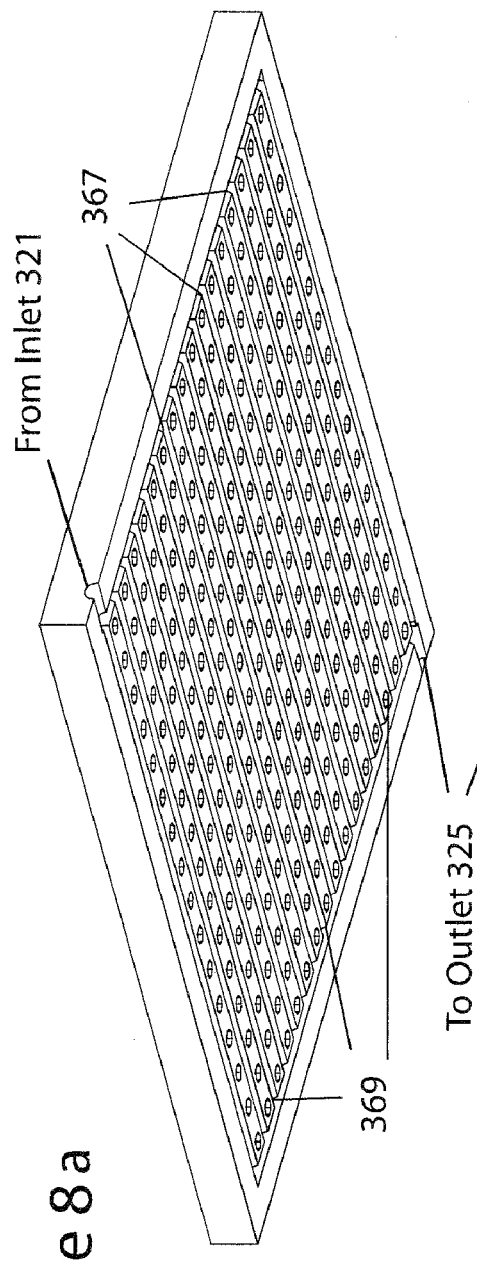
FIGS. 8a and 8b are schematic perspective views of an upper panel section and a lower panel section, respectively, of one embodiment of a composite porous HART restraint panel according to the invention.
Figure 8B:
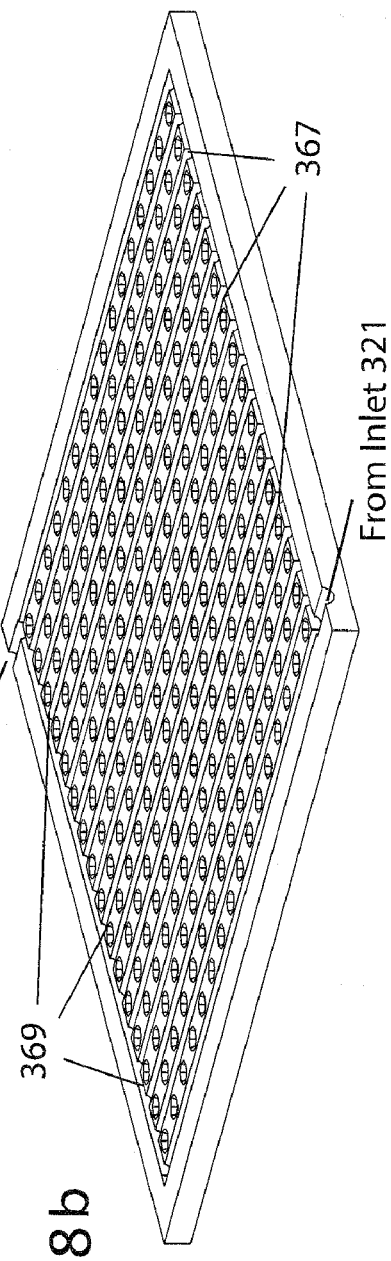

Furthermore, the refrigerant galleries can be formed as separate, longitudinally extending channels as shown in FIGS. 8a and 8b, in which case they each have a single entrance 367 and exit 369. Alternatively, the galleries may be cross-wise interconnected in a lattice pattern, as shown in FIGS. 9a and 9b. In this latter embodiment, coolant galleries 267 which carry refrigerant completely surround each pore. It should be appreciated that a wide variety of orientations of the channels or galleries that may vary from the orthogonal examples shown in FIGS. 8a, 8b, 9a, and 9b are possible, and the specific examples shown in FIGS. 8a, 8b, 9a, and 9b are used for the clarity of illustration only.

The inlets to and outlets from the refrigerant galleries in the porous restraint panels are in communication with appropriate channels (not shown) within the frames 312. The frame channels, in turn, are in communication with the HART module inlet ports 321 and outlet ports 325. Thus, liquid coolant—preferably liquid HFM—enters a given HART module 301 through the inlet port 321; circulates within the refrigeration galleries in both restraint panels 304 comprising the given HART module 301 to chill the pores (and preferably vaporizes therein, as mentioned above and as described in more detail below); and exits the given HART module 301 in either liquid or, more preferably, gaseous form.

Providing chilling that is as uniform as possible throughout the porous restraint panels is important for best hydrate growth. Best practice for even cooling using recirculated fluid refrigerant is to circulate the refrigerant fast enough to keep overall temperature drop low. In order to distribute refrigeration or chilling potential more equally throughout the porous restraint panels, a refrigerant distribution manifold 372 is provided in the lower member of a composite porous restraint at the "head" of each gallery 375, as shown in FIGS. 10a and 10b. The top wall of the distribution manifold 372 is constituted by a surface of the upper restraint panel member or by some other member (not shown) that limits the vertical extent of the manifold to just the lower restraint panel member. A means for regulating the flow of refrigerant from the manifold into the refrigeration galleries 375 (in an embodiment similar to that shown in FIGS. 6 and 7) may be provided between the end of each refrigerant gallery 375 and the distribution manifold 372. In particular, at this position, an end wall member 376 is provided, with an opening 379 that is designed to retard the flow of refrigerant into each of the galleries. This has the effect of more equally distributing refrigerant into the refrigeration galleries.

The rate at which liquid refrigerant is introduced into the cooling galleries (from the distribution manifold, if present) can be controlled by valves (not shown) at the HART module inlet 321 and/or the restraint panel inlet 383 in the lower panel section that regulate(s) the flow of liquid circulation refrigerant. Additionally, the rate of coolant flow throughout the restraint panels can be regulated by controlling the "headspace" pressure in the refrigeration galleries 355 (e.g., FIGS. 6 and 7) where a refrigerant vaporization system is used. Where pressures in the galleries are maintained close to the liquid/gas vapor pressure of the liquid refrigerant (for any particular temperature), vaporization can be retarded and the chilling potential thus controlled. More specifically, varying pressure in the galleries by pumping at the outlet controllers 327 of the HART modules 301 (FIGS. 3a and 3b) will control the rate of vaporization and hence temperature. Making the distribution of liquid refrigerant in the refrigerant gallery system of a porous restraint panel as uniform as possible and controlling the rate of vaporization of liquid refrigerant will help equalize chilling potential, and hence the capacity for uniform chilling, across a given porous restraint panel. Moreover, the manifold-to-refrigerant gallery system shown in FIGS. 10a and 10b, which distributes liquid refrigerant, will also facilitate more uniform chilling potential in cases where liquid refrigerant is vaporized.

The most uniform chilling potential can be obtained if vaporization can be controlled so as to occur uniformly across the span of a porous restraint panel. To this end, FIGS. 11a and 11b illustrate a composite permeable restraint panel 304 in which large-volume refrigeration galleries, similar to those illustrated in FIGS. 7a and 7b, are separated into two sub-galleries (essentially, the channels 355, 399 in the upper and lower panel sections 351, 353, respectively) by a "refrigerant distribution member" 391 that is disposed between the upper restraint panel section 351 and the lower restraint panel section 353 and across which liquid refrigerant vaporizes.

The larger holes 393 in the distribution member 391 coincide with the tapered pores extending through the upper and lower panel sections. The lines of small holes 396 indicate diagrammatically the locations of microporous areas or areas with very tiny holes in the refrigerant distribution member 391, which microporous or very-tiny-hole areas allow refrigerant to vaporize from the refrigerant supply galleries 399 in the lower restraint panel section into the cooling galleries 355 in the upper restraint panel section on a molecular basis. The refrigerant distribution member 391 can be fabricated from a single material such as thin metal in which tiny holes (for instance, on the order of about thirty to about eighty microns) have been drilled (for instance, by laser drilling) or from materials that have a microporous character. Alternatively, microporous membrane regions can be inset into the distribution member at appropriate locations. The refrigerant distribution member 391 is configured with microporous or very-tiny-hole areas distributed in essentially the same patterns as the channels in the upper and lower restraint panel sections.

(Microporous membrane materials are semipermeable barriers. The membranes are polymers and can have a variety of properties, e.g., hydrophobic or hydrophilic. Such membranes can also be selective or non-selective. Some polymers commonly used for microporous membranes are polypropylene and polyolefin. Microporous hollow fiber membranes typically have outside fiber diameters of approximately 300μ and inside fiber diameters of approximately 200-220μ. Porosity typically ranges from approximately 25-40%.)

In this configuration, the galleries 399 in the lower restraint panel section 353 (henceforth termed "refrigerant supply galleries") are continuously filled with liquid refrigerant during operation of the apparatus. By lowering vapor pressure in the refrigeration galleries 355 in the upper section 351 to below the vapor pressure of the gas/liquid transformation point of the specific refrigerant, the liquid refrigerant in the refrigerant supply galleries can be caused to vaporize through the microporous regions 396 of the refrigerant distribution member 391 and into the galleries 355 in the upper panel section 351, thus providing cooling of the upper panel section 351 generally, i.e., on the gas side of the microporous membrane, because vaporization tends to occur uniformly at all pores. This process may be referred to hereafter as "area vaporization." (Cooling of the liquid refrigerant side of the microporous membrane 391 in the lower section 353 is not desired; therefore, cooling is desirably restricted to just the upper panel section 351, where it is desired.)

In general, refrigeration is important because the temperature of the surfaces of the tapered pores of the restraint panels must be lowered to a point where hydrate is stable and will grow. Additionally, heat produced by the exothermic formation of hydrate must be removed by refrigeration so that the hydrate will continue to grow outwardly into the seawater being treated. Area vaporization provides for the most uniform distribution of chilling potential, especially where small changes in chilling potential are required over the entirety of a porous restraint panel (or in any other vaporizer apparatus in which area vaporization may be employed). Uniform chilling potential and the ability to control small temperature changes over a large area uniformly are important because, in general, it is highly desirable for hydrate to be grown at a uniform mass rate across the entire surface of a given restraint panel. Fine-scale temperature control and uniformity of temperature over the entirety of the refrigerated area in which gas hydrate is to be grown optimize pressure-sealing and water- and gas-removal from the upstream side of a porous restraint as per the process illustrated in FIGS. 4a and 4b.

To achieve a desired amount of chilling, liquid refrigerant is introduced into the refrigerant supply galleries 399. Refrigeration is effected by reducing the vapor pressure of gaseous refrigerant in the refrigeration galleries 355 to below the vapor pressure of the gas/liquid transition point (for any particular temperature) by pumping. When the vapor pressure in the refrigeration galleries is in the vapor phase for that refrigerant, vaporization takes place at or near the refrigerant distribution member 391 because gas is the stable phase at the lower pressure. The lower the pressure that is maintained in the refrigeration galleries 355, the greater the cooling that is provided. In this manner, a particular range of chilling potentials and temperatures can be maintained in the refrigeration galleries 355 by controlling the amount and rate of vaporization of refrigerant. This pressure-based control of vaporization, and hence chilling potential, facilitates fine-scale control over and uniformity of temperature throughout the gallery system.

Extracting gas from the refrigeration galleries 355 using relatively small gas pumps—located anywhere in the gas extraction system between the gas exhaust 330 on the HART module frame 312 and the gas collector and handling system that is described below—controls vapor pressure in the refrigeration galleries 355. Lowering gas head pressure faster to achieve greater cooling is achieved by faster pumping. Lowering pressure in the gas headspace more slowly reduces cooling. If the rate of pumping falls to too slow an extraction rate, the gas and liquid sides of the refrigerant distribution member 391 will tend to equilibrate in pressure.

Although the refrigerant distribution member 391 is generally located between the upper restraint panel section 351 and the lower restraint panel section 353, the exact configuration and arrangement of the components may be slightly more complex than that shown and described above, with beneficial results. For example, where the individual components of the composite porous restraint panels are formed so that they partially nest within each other (as opposed to fitting together with essentially flat junctions), the strength of the composite porous restraint panel assembly can be increased. For example, as shown in FIGS. 12a and 12b, the cone walls of the tapered pores in the upper panel section 351 fit into and extend slightly into the pores in the lower restraint panel section 353. Because the parts essentially snap into each other, considerable strength is imparted to the assembled composite restraint panel. It should be understood that small differences in the shape and arrangement of the members—for instance, to provide a spacer against the lower member—may be implemented and are within the scope of the invention, although they are not described here in detail. If the joints between the components are essentially flat, shear along the boundaries of the components due to differential pressure may cause small leaks of seawater or refrigerant; this can be avoided by making one or both of the upper and lower panel sections mechanically strong, but that may result in additional material and weight penalties. If, on the other hand, the upper and lower restraint panel sections interengage with each other as shown in FIGS. 12a and 12b, for example, a shear plane is less likely to form at the junction between the upper and lower restraint panel sections and, accordingly, the panel will be less likely to leak. Additionally, one or more of the parts can be made thinner and lighter to take account of the increased mechanical strength of an interengaging design.

In embodiments of the invention that use a three-component composite restraint panel as shown in FIGS. 11a, 11b, 12a, and 12b, for example, sealing the refrigeration system on the interior of the composite restraint panel from the water, gas, and hydrate phases on the outside of the restraint panel is important. Therefore, the parts may be welded, heat-bonded, or brazed/welded together; diffusion-welded in the case of special metals such as titanium; or joined by other methods. If the components are thermoplastic or if more than one material is used, glue or chemical bonding (which may also be used with metal) may also be used to join the parts together. Some composite porous restraint panels may include O-ring sealing, at least in part. Following assembly, the entirety of the three components are firmly joined together to form a single, integrated restraint panel unit, with the liquid refrigerant supply galleries 399 (as well as the gaseous refrigerant galleries 355) completely separated from the tapered pores.

Figure 13:
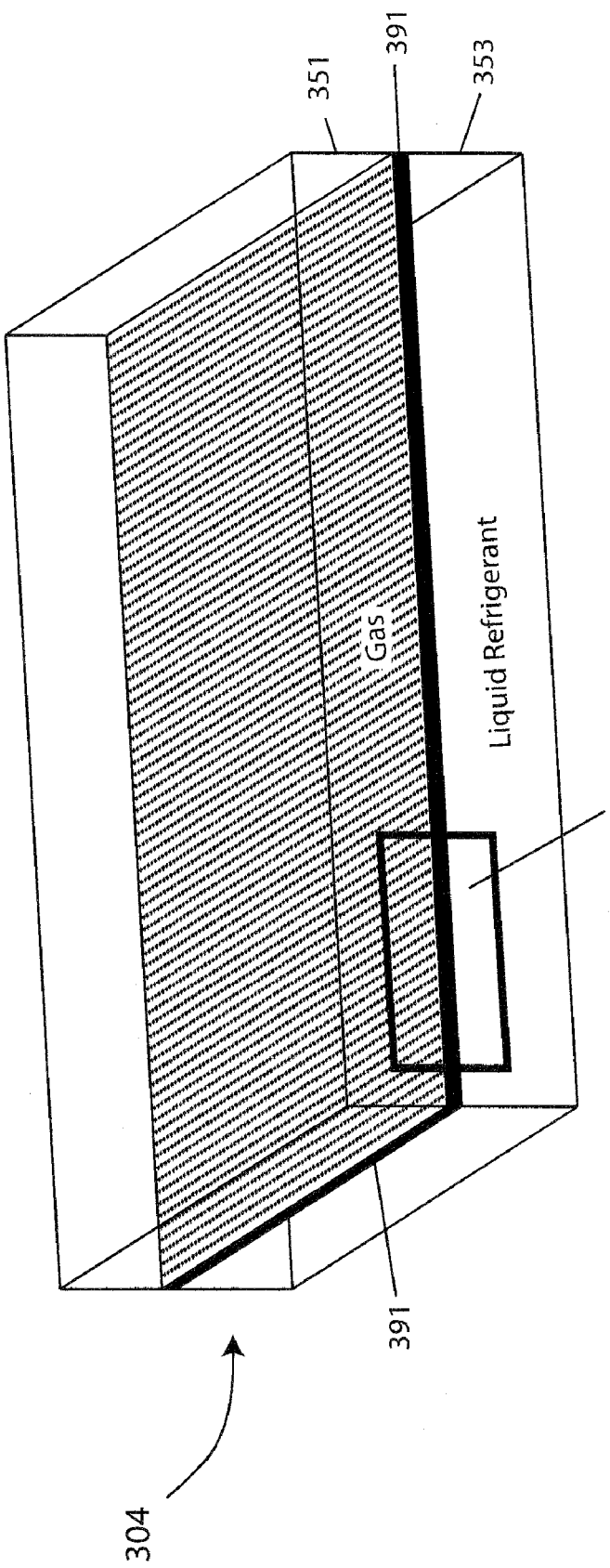
FIG. 13 is a schematic perspective view illustrating a heat exchange panel (e.g., a porous HART restraint panel) according to the invention.

The refrigerant distribution member 391 facilitates uniform distribution and control of chilling potential in the preferred embodiment of the refrigeration system. FIG. 13 illustrates in general, with internal details of the upper and lower restraint panel sections 351, 353 removed for simplicity, how the refrigeration effect is achieved. As noted above, the refrigerant distribution member 391 contains tiny holes (shown as uniformly distributed for simplicity). Liquid refrigerant occupies the internal spaces within the lower restraint panel section 353, while gaseous refrigerant normally occupies the internal spaces within the upper restraint panel section 351. The potential for chilling via vaporization of the liquid refrigerant through the microporous holes in the refrigerant distribution member 391 is the same throughout the entirety of the gas spaces, in which pressure differences will rapidly equilibrate.

A detailed, highly magnified schematic cross-section of the refrigerant distribution member 391 (FIG. 14) illustrates the relationship between the liquid and gaseous phases of the refrigerant. The refrigeration effect—i.e., the degree of cooling—is managed by controlling pressure on the gas side, e.g., by pumping as alluded to above. So long as vapor pressure on the gas side of the refrigerant distribution member 391 is in equilibrium with vapor pressure of the liquid refrigerant on the opposite side of the refrigerant distribution member 391 (i.e., in the refrigerant supply galleries 399), no mass transfer of refrigerant occurs between the liquid and the gas sides of the distribution member 391. (In this state, the vapor pressure of the system is the vapor pressure of the liquid refrigerant (for any particular temperature).) When pressure in the galleries in the upper restraint panel section is lowered, however, the vapor pressure of the liquid refrigerant becomes higher than the pressure on the gas side, and mass transfer through the micropores in the refrigerant distribution member 391— illustrated by the arrows in FIG. 14—takes place from the liquid side of the refrigerant distribution member to the gas side of the refrigerant distribution member. Thus, varying pressure on the gas side of the refrigerant distribution member can be used to regulate vaporization of the liquid refrigerant in the supply galleries 399, and hence cooling of the pores in the restraint panels in general.

Figure 14:
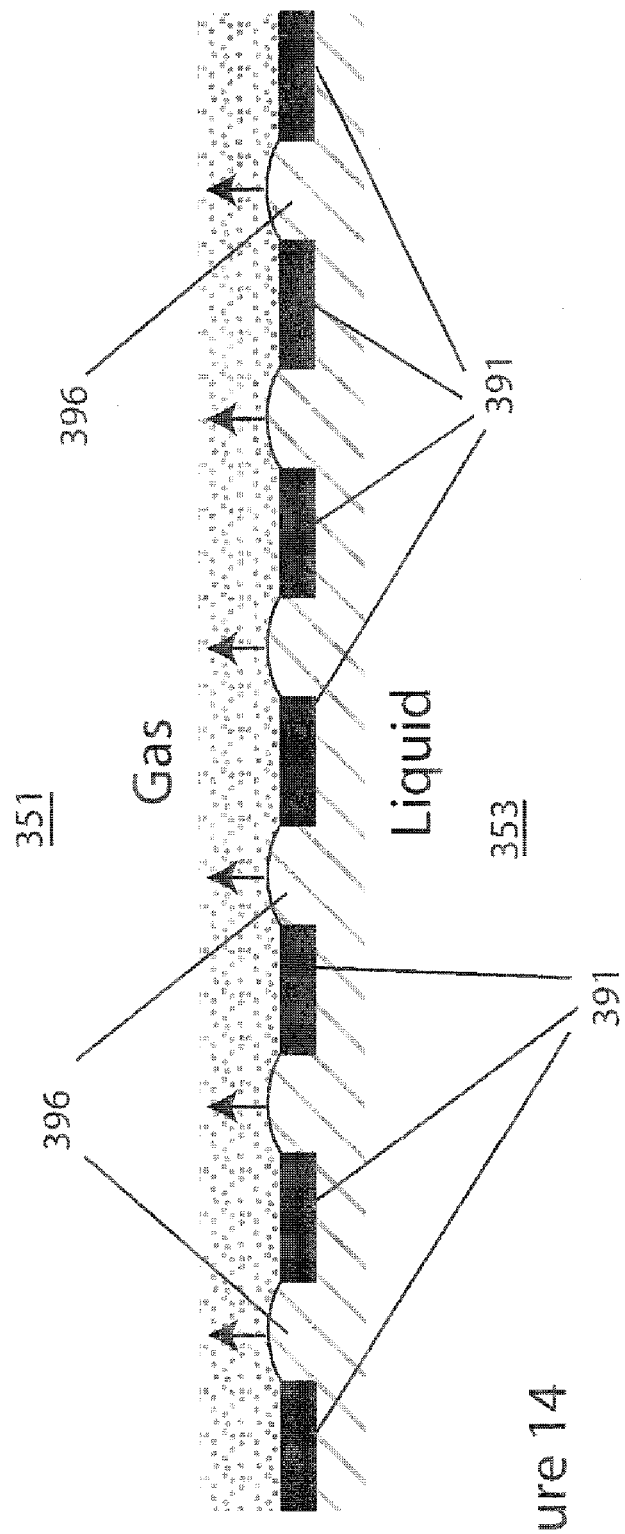
FIG. 14 is an enlarged, schematic side view of the boxed portion thereof illustrating vaporization of a liquid refrigerant across a refrigerant distribution member.

Thus, the refrigerant distribution member 391 essentially functions as a phase partition and separates liquid refrigerant from gaseous refrigerant. If little or no vaporization is taking place across the refrigerant distribution member 391 and the cooling potential is small, the liquid side of the refrigerant distribution member is maintained at or just above the vapor pressure of the gas/liquid transition, and the gaseous side of the refrigerant distribution member is held at or below the vapor pressure of the refrigerant. Increasing the pressure differential across the refrigerant distribution member will increase the rate of vaporization and therefore increase the cooling potential. The micropores 396 are phyllic to the particular refrigerant (for example, $CO_2$). Therefore, liquid refrigerant fills the micropores but surface tension holds it within the micropores and prevents it from passing as droplets or as a surface film onto the other side of the refrigerant distribution member, so long as the pressure differential does not become excessive, as illustrated in FIG. 14. The gas side of the refrigerant distribution member may be coated with material such as a metallized surface that is phobic to the liquid refrigerant to keep the liquid refrigerant from wicking onto the gas side of the refrigerant distribution member. Vaporization is most efficient thermally when it takes place entirely at the gas/liquid interface at the distribution member 391 or within the gas chamber.

The chilling effect of vaporizing refrigerant across the refrigerant distribution member is approximately the same throughout all of the gas space within a given restraint panel because approximately the same rate and amount of vaporization takes place everywhere along the refrigerant distribution member. This is because the liquid in the liquid refrigerant supply galleries 399 and the gas in the refrigerant galleries 355 constitute individual hydraulic systems that interact at the refrigerant distribution member. Therefore, because the amount of vaporization and hence refrigeration can be regulated closely by varying pressure in the refrigeration galleries 355, the system response to changing conditions and thermal demand required to chill the water and maintain temperatures at which hydrate will form is greatly improved as compared to the prior art.

During periods of higher chilling requirements, the vapor pressure differential between the liquid and gas sides of the refrigerant distribution member may become great enough for liquid droplets to be ejected through the refrigerant distribution member into the otherwise gas-filled refrigeration galleries 355, where they vaporize rapidly and contribute to cooling. This is because the surface area for vaporization of the liquid droplets is greater than that which is normally available on the pore area of the refrigerant distribution member. This further accelerates the chilling process and may be used as a technique to increase cooling potential above that which is afforded by vaporization at just the surface of liquid exposed in the micropores.

If a strictly circulating liquid refrigerant system is used for cooling/refrigeration instead of vaporization across the refrigerant distribution member 391, larger holes may be provided in the refrigerant distribution member (if one is even used at all) to allow the liquid refrigerant to pass more easily and uniformly from the refrigerant supply galleries 399 to the refrigerant galleries 355, since the inherent viscosity of liquid refrigerant will otherwise tend to restrict the speed of its passage through the refrigerant distribution member 391. The sole difference necessary for the refrigerant distribution member to be used to equally distribute liquid instead of vaporization is in the size of the distribution holes in the member; the overall benefit of the refrigerant distribution member—equal distribution of chilling potential—is, however, essentially the same.

If the $LCO_2$ is pure enough such that small particles do not exist within it that could otherwise clog the vaporizer system, then $LCO_2$ can be employed directly from a surface feed. This pass-through mode would involve no special recompression apart from that applied to gaseous $CO_2$ recovered from the dissociated hydrate. It is likely, however, that a vapor compression system using the same $CO_2$ may be employed. Once it is purified of particulate matter, it can be cycled indefinitely, with topping up only necessary to replace leaks. A purification/recharge system for the cooling of porous restraints by recirculating vapor compression methods may be implemented in the immediate vicinity of the enclosure 8 or near the $LCO_2$ supply.

Reverting to more general considerations, a porous restraint panel according to the invention preferably has equal thickness for all pore walls—the controlling surfaces for heat exchange for the uniform growth of hydrate—and is as thin as possible so that heat transfer is enhanced. This class of porous restraint panel is referred to as "thin-wall" and can be produced in limited numbers by machining or in larger numbers, for lower cost, by stamping (for instance, of thin metal sheets) or forming (for example, using a fluid-to-solid casting or extrusion process). Whereas machined components (e.g., as shown in FIGS. 6, 7, and 11) begin with metal or other suitable material such as plastic or composite material similar to carbon fiber that is at least as thick as the final restraint panel component, thin-wall porous restraint panels may be fabricated from thin sheets of material that are formed into complex, three-dimensional shapes. There are two basic ways to make thin-wall restraint panels: stamping and forming. In stamping, a sheet of metal such as titanium alloy that is very resistant to marine corrosion (or other suitable material such as plastic) is stamped in a die by inserting the sheet of material in the die and pressing the sheet between the two dies. Formed components, on the other hand, can be extruded or cast.

Figure 15A:
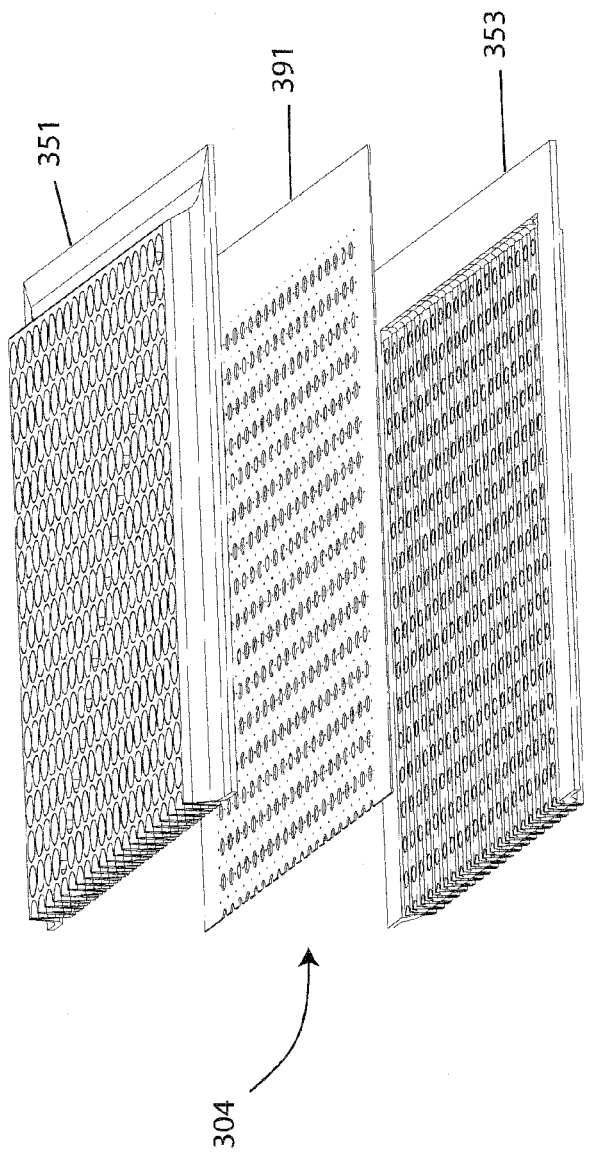
FIGS. 15a and 15b are a schematic exploded view and a schematic perspective view, respectively, of a portion of another embodiment of a porous HART restraint panel according to the invention, including a refrigerant distribution member.
Figure 15B:
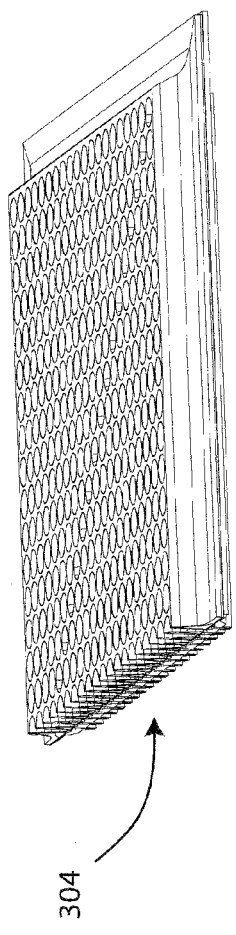

FIGS. 15a and 15b illustrate a thin-wall upper restraint panel section 351, a refrigerant distribution member 391, and a lower restraint panel section 353 assembled into a single porous restraint panel (FIG. 15b). The upstream face of the composite restraint panel faces outward from a frame in which the restraint panel is supported in much the same general manner as shown in FIGS. 3a and 3b for composite restraint panels having about equal thickness. Because thin-wall porous restraint panels can be fabricated so that the pore walls are thin everywhere and have about the same thickness, the refrigerant galleries 355 and the liquid refrigerant supply galleries 399 can constitute a substantial proportion of the overall volume of the whole thin-wall restraint panel, which renders thin-wall restraint panels highly efficient heat exchangers. Most important, however, is the fact that because the pore walls have constant thickness, the chilling effect can be uniform throughout all of the tapered pores in the upper section 351 adjacent to the refrigeration galleries 355, and uniform chilling will optimize uniform hydrate growth in the pores.

Figure 16A:
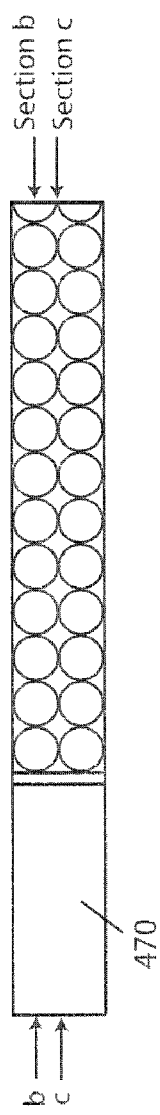
FIGS. 16a, 16b, and 16c are a schematic plan view, a schematic section view, and another schematic section view of a portion of the porous HART restraint panel shown, for example, in FIGS. 15a and 15b.
Figure 16B:
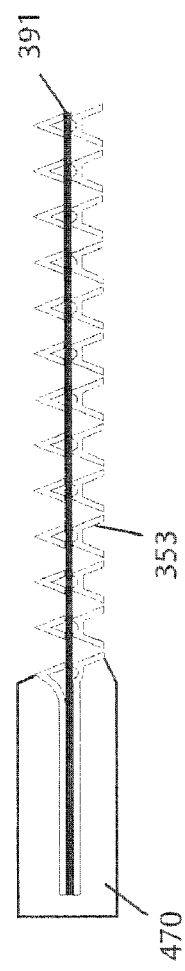
Figure 16C:
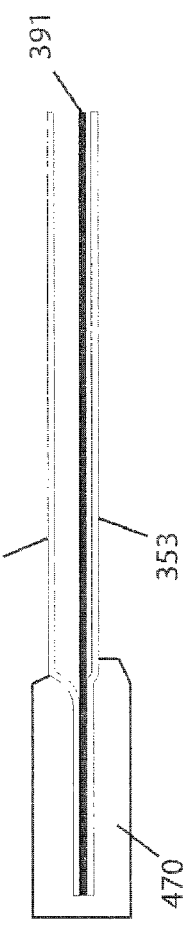

FIGS. 16a, 16b, and 16c illustrate (for just two rows of pores) an arrangement for mounting a thin-wall composite restraint panel, which has relatively thin edge margins. FIGS. 16a, 16b, and 16c show an example of an edge member 470—preferably made from plastic—that is cast around the edges of a single porous restraint panel 304. The edge member 470 brings the thin edge margins of the restraint panel to about the same overall thickness as the rest of the composite porous restraint panel and lets the restraint panel be mounted in a HART module frame in essentially the same manner as discussed above and illustrated in FIGS. 3 and 4 for a composite restraint panel having about uniform thickness. A section view taken through the centers of the tapered pores (FIG. 16b) shows the pores in the upper panel section 351 and the lower panel section 353. The position of the refrigerant distribution member 391 is shown in solid black. In a section view that is taken between the mouths of the tapered pores (FIG. 16c), the thickness of the upper panel section 351 and the lower panel section 353 are more apparent. The distribution member 391 is again shown in solid black.

Figure 17:
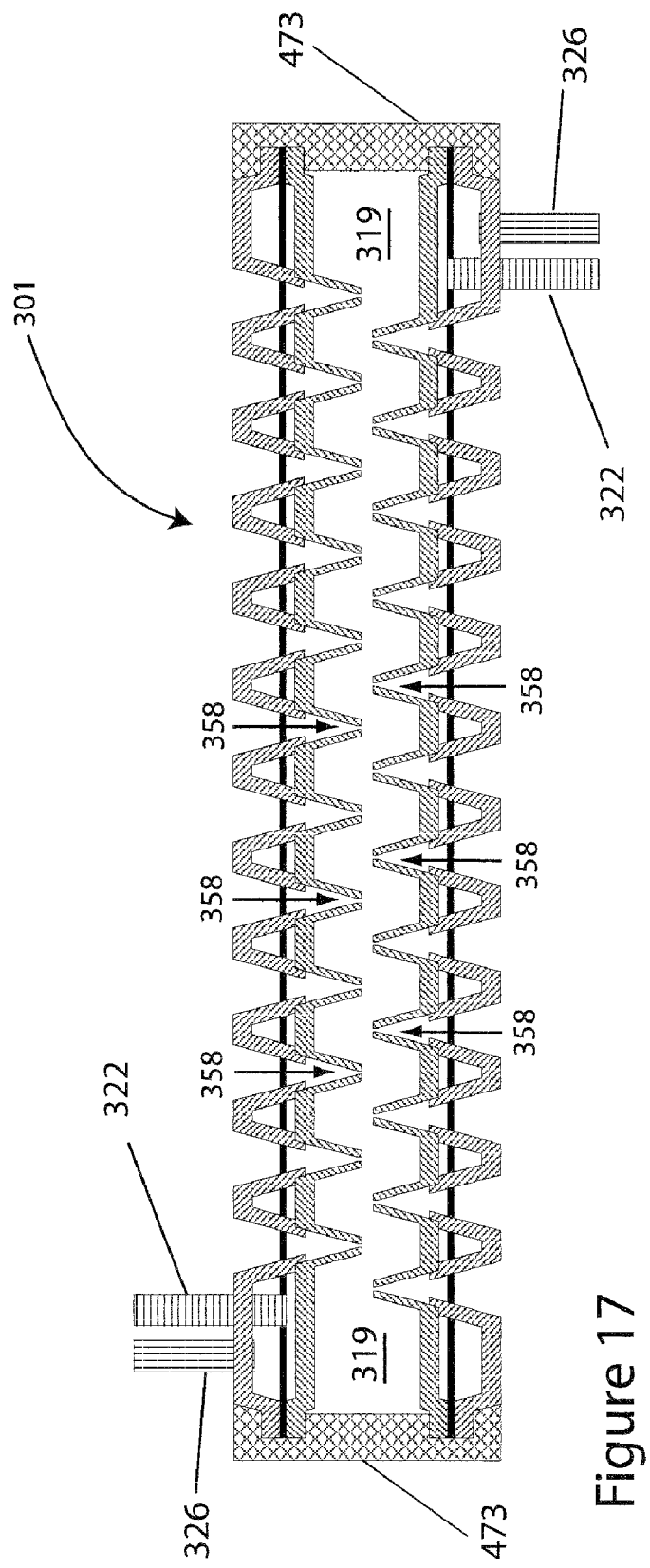
FIG. 17 is a schematic section view of another embodiment of a HART module according to the invention.

Alternatively, in a preferred embodiment as illustrated in FIG. 17, two porous restraint panels may be cast so that they are integral with a frame 473 (analogous to the frame 312 shown in FIGS. 3a and 3b), together with which they form a basic HART module (e.g., as discussed earlier in relation to FIGS. 3a, 3b, 4a, 4b, and 5). Spacers (not illustrated) can also be added within the internal chamber 319 during fabrication to help maintain a constant width of the central chamber 319 when pressure therein is reduced during operation of the apparatus of the invention. Additionally, in this configuration of a HART module, the frame itself does not contain refrigerant inlet ports and exhaust ports (e.g., as described above in connection with FIGS. 3a, 3b, 4a, 4b, and 5); rather, inlets 322 and outlets 326 to one or more locations on each composite restraint are provided. (One inlet and outlet are shown per each composite porous restraint panel in FIG. 17, but this is for illustration purposes only.) Thus, the frame and refrigerant distribution system can be implemented in a number of different ways—both through the frame and directly to each composite porous restraint.

Furthermore with respect to this embodiment, the tapered pores 358 are preferably staggered or offset with respect to each other so that each HART module 301 can be made thinner. This arrangement also improves the overall process of hydrate growth and dissociation in each tapered pore, which will be explained in greater detail below.

In all of the embodiments of porous restraint panels described herein, other apparatus may be added to achieve better thermodynamic performance and to enhance liquid, gas, and water flows. For instance, where it is desired to have more than one internal gallery system for chilling or for carrying a sensor system (mainly pressure and temperature sensors), these may be implemented using another member in the composite restraint panels. Furthermore, a layer of insulation may be added on the face of each of the porous restraint panels in order to prevent unwanted or excessive hydrate from forming on the restraint panels in regions other than the tapered pores. Surfaces may also be treated, for instance, by anodizing or coating with corrosion-resistant materials such as TEFLON to prevent biofouling or to facilitate hydrate growth.

Expanding the focus of this disclosure back to the overall systems of the invention, arrays of HART modules 301, in which the porous restraint panels support hydrate growth and function as heat exchangers, support desalination by promoting controlled growth of gas hydrate. Such arrays are provided in enclosures 8 that substantially or completely isolate water being treated by the HART apparatus from open seawater, preferably in a marine environment, so that conditions suitable for gas hydrate nucleation and growth can be maintained within the enclosures 8. Nucleation and growth of gas hydrate is facilitated in part by means of liquid refrigerant in either in a circulating system or in a vaporization mode, as described above.

Furthermore, refrigerant—preferably which is also a hydrate-forming material, as noted above—is advantageously utilized according to the invention in several ways. First, the refrigerant is used to control directly the temperature of the water being treated. In particular, injecting refrigerant (such as liquid carbon dioxide) directly into the water being treated within an enclosure 8 or a pressure vessel (e.g., as shown in FIG. 31), which refrigerant vaporizes and/or expands upon release into the seawater, cools the water to a desired temperature just above that suitable for hydrate formation since the refrigerant absorbs heat energy from the water as it vaporizes/expands. Thus, by regulating the amount of such liquid or gaseous HFM released into the enclosure or pressure vessel, the desired pseudo-ambient temperature can be maintained within the enclosure or pressure vessel. Moreover, so injecting refrigerant that is an HFM into the water being treated helps maintain saturation (or even supersaturation) concentration levels of dissolved HFM that are suitable for hydrate growth, regardless of the temperature of source water (for common natural seawater temperatures). (Pressures required for any particular HFM to nucleate and grow hydrate are generated by immersing the enclosure 8 to an appropriate depth in the body of water in a marine-based application of the invention or by pumping and/or vaporization within a pressure vessel in a pressure vessel-based application of the invention.)

Second, highly localized conditions for controlled hydrate nucleation and growth are created and maintained on the porous restraint panels by virtue of their internal refrigeration. In a particularly preferred embodiment of the invention, liquid refrigerant (e.g., liquid carbon dioxide) is the hydrate-forming material used in the practice of the invention and is vaporized as part of the refrigeration process, as described above. In that case, the gasified HFM produced by vaporization of the liquid refrigerant HFM may be injected into the water being treated, where it contributes to hydrate growth. Alternatively, is so desired, gasified liquid refrigerant may be recompressed and recirculated in a vapor compression-based refrigeration cycle. In that case, the refrigerant in the refrigeration system is isolated from the water being treated, and the refrigerant does not need to be the same as the HFM used for practice of the invention (or even an HFM at all).

To better understand overall operation of the invention, it is useful to understand the pressure and temperature relationships in a normal seawater region where the invention may be operated and to more fully understand how pressure, temperature, and concentration of dissolved HFM ($CO_2$ in the example used here) can be manipulated. This is because a number of naturally occurring oceanographic conditions and physical processes are utilized in the practice of the invention, which conditions and processes are not commonly used in the manner they are used in this invention.

Many materials used as refrigerants are also hydrate-formers, including ammonia, sulfur dioxide, ethyl chloride, carbon tetrachloride, isobutane, propane, methylene chloride, chlorofluorocarbons (including FREON), and carbon dioxide ($CO_2$). The solubility, vapor pressures at a liquid/gas interface, and chemical reactions of the various refrigerant/hydrate-formers with water (and substances normally found in seawater) vary considerably and should be taken into consideration in selecting and using a particular material as a refrigerant/hydrate-former.

Although a number of hydrate-forming gases may be used, a preferred hydrate former for use in the invention is $CO_2$. $CO_2$ has a number of attributes that make it a preferred HFM for desalination through gas hydrate using the invention. $CO_2$ is very soluble in water, so a relatively small volume of water can contain a substantial amount of dissolved gas, especially under pressure. $CO_2$ dissolves quickly in seawater, and the seawater is thus a good media for diffusion mass transfer, which is important for the process of growing hydrate. $CO_2$ hydrate has been shown to nucleate spontaneously and grow easily, both experimentally in the laboratory and in the open ocean. $CO_2$ is an excellent hydrate former, with hydrate that exhibits strong rejection of dissolved solids and saline droplet impurities, which makes $CO_2$ an ideal HFM for desalination and water separation in general.

$CO_2$ is non-combustible, easy to handle, and relatively safe. Even though $CO_2$ is corrosive to certain metals at high concentrations, such corrosion can be mitigated through careful selection of materials. It is also commercially available almost world-wide as a liquid that can be stored in relatively low-pressure containment vessels without refrigeration, and it is available at relatively low cost. Furthermore, this already low cost is expected to decrease over time, in part because $CO_2$ from concentrated sources such as power generation is going to be captured and disposed of in either the sea or geological reservoirs according to the Kyoto accords in order to mitigate global climate change (warming). Thus, disposal of $CO_2$ may actually render $CO_2$ used in the desalination process a profit item rather than a cost item. In addition, concentrated $CO_2$ is a strong biocide, so little biofouling is likely to occur within the apparatus itself (although its dispersal in the ocean as part of the disposal process may quickly render the effluent innocuous to biota). Furthermore, $CO_2$ is an excellent refrigerant because of its current low cost, availability, non-toxicity, and biomedically benign nature.

Figure 20:
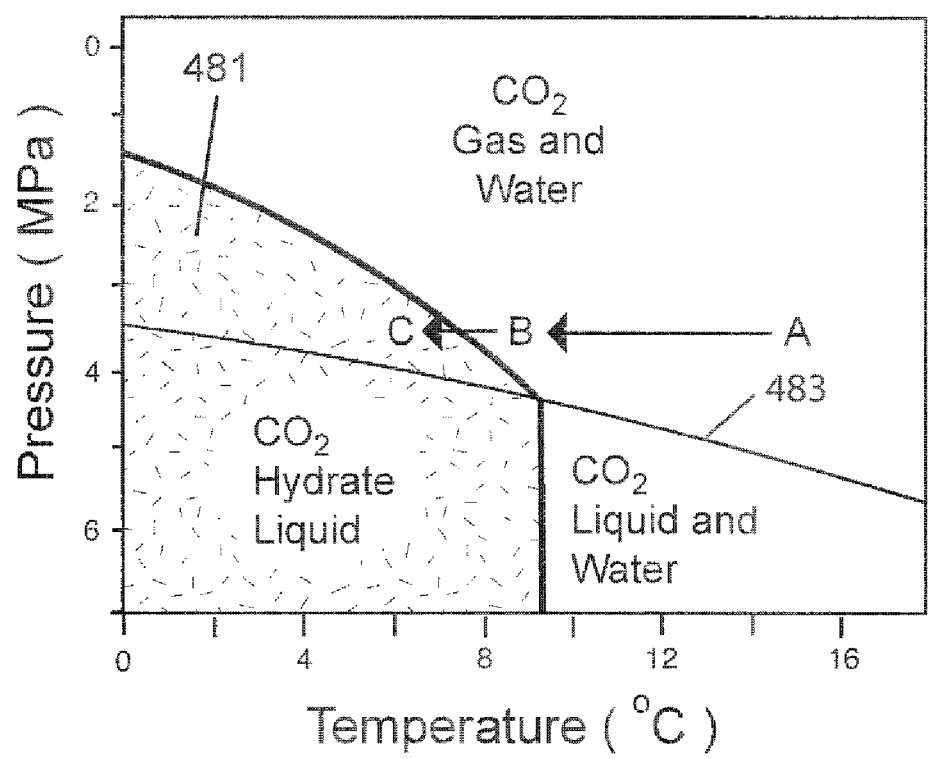
FIG. 20 is a plot showing the $CO_2$ hydrate stability field in pressure/temperature space, along with the $CO_2$ liquidus, and control of temperature in practicing the invention.

$CO_2$ is used in this invention both to reduce the pseudo-ambient water temperature (so that hydrate will nucleate and grow) and to provide the HFM that will combine with water to form the desalination-effective hydrate. Thus, in the most preferred implementation of the invention, $CO_2$ infusion into the water being treated and $CO_2$-based chilling—due to both infusion/vaporization/expansion of $CO_2$ in the water being treated and refrigeration in the heat-exchanging restraint panels—take place as part of the same overall inventive process. In order for $CO_2$ hydrate to nucleate and grow at a suitable pressure-depth region, the seawater must be supersaturated with HFM at the given pressure and the temperature of the water being treated usually must first be reduced from its ambient temperature to a required lower temperature. Injecting liquid $CO_2$ ($LCO_2$) into an enclosure 8 or pressure vessel at a temperature above the liquid-to-gas phase transition in pressure-temperature space (hereafter referred to as "liquidus"; FIG. 20) will cause violent vaporization and dissolution of the $LCO_2$ into the water being treated. According to the invention, the rate of injection of $CO_2$ is controlled so that all of it dissolves into the water being treated, even though a transient phase of very tiny bubbles may exist from time to time, which bubbles will dissolve rapidly. An ideal state may be reached when a few very small gas bubbles coexist with supersaturated water, with the remainder of the infused $CO_2$ having been dissolved to the existing physical limits of the system. Thus or even supersaturation), apparatus within the enclosure or within the water being treated to specifically measure the concentration of dissolved $CO_2$ is not required. Rather, the existence of a small, exsolved gas head in the enclosure 8 or pressure vessel (not shown) in which the invention operates is sufficient to indicate supersaturation and hence the existence of favorable hydrate growth conditions.

Figure 18:
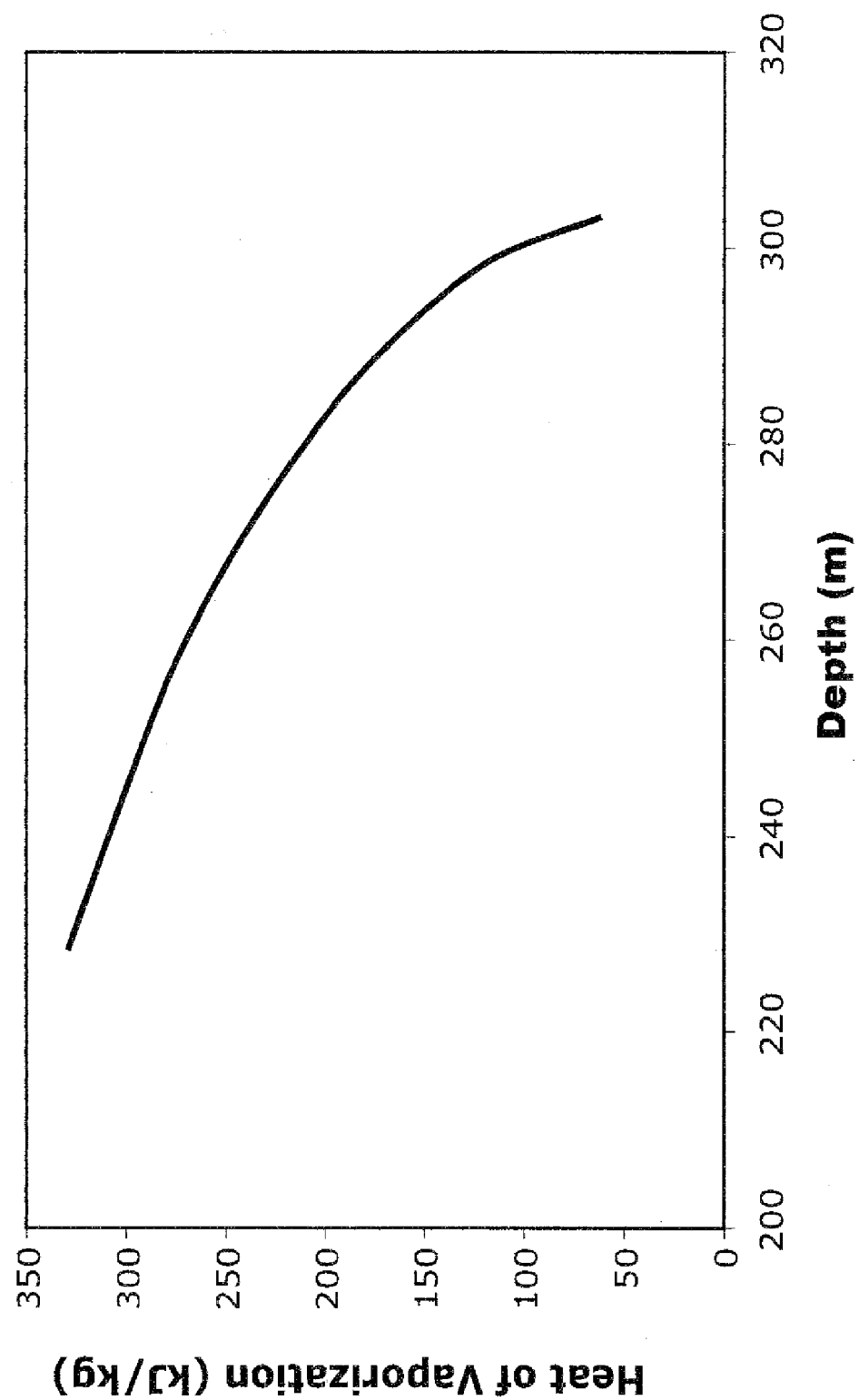
FIG. 18 is a graph illustrating the variation of heat of vaporization of liquid HFM (liquid $CO_2$) with depth.
Figure 19:
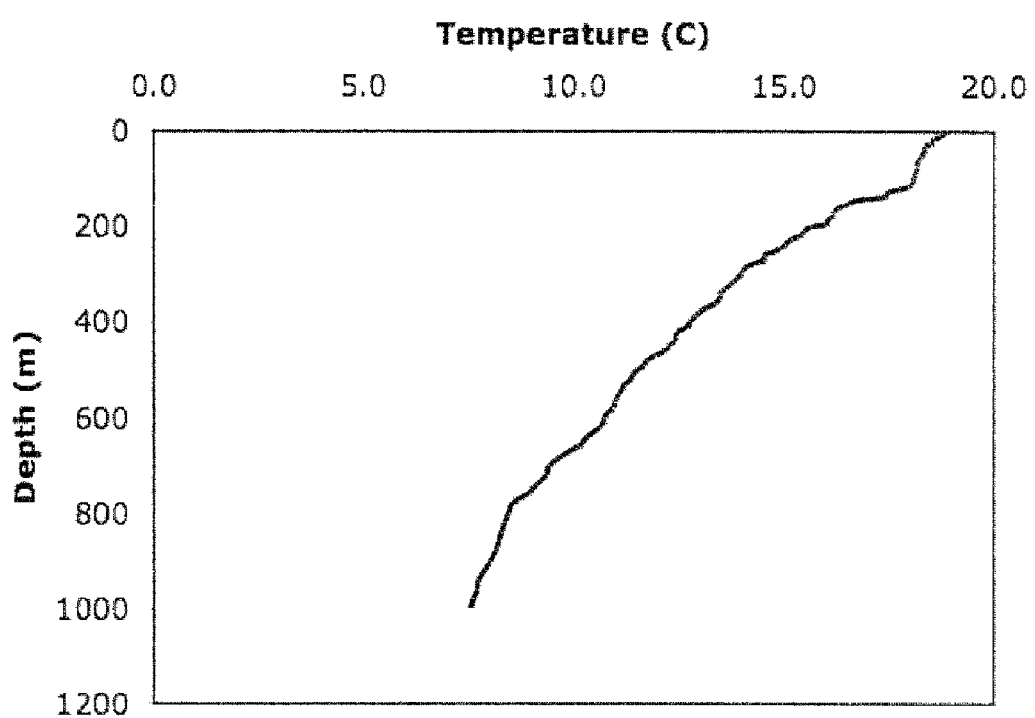
FIG. 19 is a graph illustrating the variation of water temperature with depth in an exemplary open-ocean environment.

Although source seawater (or other water being treated) can be refrigerated or pre-chilled elsewhere by heat transfer with a circulating chilled fluid or other refrigeration apparatus, as noted previously, the invention preferably uses liquid HFM to chill/refrigerate the water by direct vaporization within an enclosure 8 or other pressure vessel. Vaporization of $LCO_2$ is endothermic as a function of the change of state of the material. FIG. 18 is a graph of the heat of vaporization of $CO_2$ for different water depths using an assumed ambient seawater temperature of about 15° C., which is approximately the temperature of low-latitude ocean water masses at a depth of about 300 meters. (For example, FIG. 19 shows an actual, measured hydrothermal profile from near the Canary Islands in the eastern central Atlantic Ocean.) The heat of vaporization data allows one to calculate the amount of liquid and gaseous $CO_2$ that must be injected into the water to obtain a desired water temperature within an enclosure from any starting ambient water temperature. For any water temperature/ depth profile, a control diagram that dictates the amount of liquid HFM that must be vaporized to cool the source water of any normal ocean temperature to the required hydrate-forming temperature within an enclosure may be calculated and plotted.

FIG. 20, which is a plot of the pressure/temperature field of $CO_2$ hydrate stability (the speckled region 481) illustrates the process of cooling the water being treated and then the effect of chilling the porous restraint panels to cause gas hydrate to form on them. In particular, hydrate is stable to the left of the phase boundary, which separates the pressure/temperature field of hydrate stability (speckled) from the field to the right of the phase boundary, in which hydrate is unstable. (Concentration of the dissolved HFM is also an important factor to understand and consider, but for purposes of this discussion, the water being treated may be regarded as supersaturated during both hydrate growth and dissociation.) In general, according to the invention, ambient-temperature seawater at temperature Point A (assumed for this discussion to be about 15° C.) is brought into an enclosure 8 containing an array of HART modules, which are configured as described previously. When water within the enclosure is injected with $LCO_2$ at a pressure above (as shown on the phase diagram) the $CO_2$ gas/liquid transition 483 for a range of temperatures, the $LCO_2$ vaporizes and cools the seawater to point B. (Depending on initial pressure, the line along which temperature decreases will be approximately horizontal.) The temperature at this point is closer to being suitable for hydrate formation, but it is not quite cold enough for hydrate to nucleate and grow. (For increasingly higher starting water temperatures, increasing amounts of vaporization are required to cool the water being treated.)

Under operational conditions, the temperature of the seawater after $LCO_2$ is vaporized by being injected into it is monitored and the rate of dissolution of $CO_2$ is controlled to maintain temperatures just above the hydrate phase boundary and to compensate for changes in the source water temperature. Further vaporization of $LCO_2$ beyond that amount will simply increase the amount of $CO_2$ in the water and lower the temperature of the water throughout the enclosure to within the field of hydrate stability, thus causing hydrate to form generally throughout the water mass where it is not wanted.

Subsequently, further cooling/refrigeration provided by the porous restraint panels will lower the temperature of the water being treated from Point B, which is the water temperature within the enclosure generally, to Point C; the temperature at Point C is the temperature of water being treated immediately at the surface of and adjacent to the porous restraint panels (i.e., on the walls of the tapered pores) and is within the field of hydrate stability. Therefore, hydrate will form and grow within the pores of the restraint panels upon further cooling of the water being treated from Point B to Point C.

Once sufficient hydrate has formed within the pores of the restraint panels to clog and pressure-seal them, pressure within the narrow chamber 319 is reduced, e.g., by pumping. As noted above and explained in further detail below, the portions of hydrate that are exposed to that reduced pressure—ideally, hydrate that is protruding into the lower portions of the bi-cone tapered pores, i.e., the portions of the pores that are formed within the lower restraint panel sections 353—will dissociate back into relatively pure water (i.e., converted water) and gaseous HFM, which pass into the chamber 319. From there, the converted water 339 and gaseous HFM 330 (FIGS. 3a, 3b, 4a, 4b, and 5) are withdrawn from the HART modules 301 and handled according to further processing steps as described in more detail below.

In addition to the advantages of using $CO_2$ for hydrate-based desalination enumerated above, a further benefit of using $CO_2$ ($LCO_2$) for hydrate-based desalination in a submerged apparatus is that its transformation of state between liquid and gaseous forms takes place at pressures that are encountered at relatively shallow depths in the sea or other bodies of water. The pressure/temperature region of the $CO_2$ hydrate stability field, in which $LCO_2$ hydrate-based desalination is practiced, is within the field 481 of hydrate stability above the liquidus 483 (FIG. 20). (The higher-pressure region of hydrate stability below the liquidus will have much slower hydrate growth rates associated with it.) Thus, the pressure required for $CO_2$ hydrate to form may be achieved relatively easily by positioning an enclosure 8 with HART modules 301 arrayed therein within this range of water depths, and then controlling water temperature appropriately.

Regarding the conditions for hydrate growth, in order for hydrate growth to be maintained on the porous restraint panels, $CO_2$ should be kept at supersaturation levels in the seawater in the enclosure. Ideally, this is accomplished without lowering the overall water temperature in the enclosure (due to $LCO_2$ vaporization) to such an extent that hydrate forms generally throughout the enclosure, as alluded to above. This is because residual water—i.e., enhanced salinity brine within the enclosure that is "left behind" as hydrate is formed and extracts pure water from the seawater—will eventually be discharged from the enclosure, and hydrate that forms generally within the water mass will tend to be lost with that residual water, thus wasting HFM and lowering efficiency of the inventive process. Therefore, one or both of two solutions to this concern may be implemented in order to maintain the water being treated at the desired temperature and concentration.

In particular, warmer water from either greater or shallower depths may be introduced to the enclosure as the ambient water to be treated, or it may simply be mixed with ambient water immediately surrounding the enclosure. This facilitates further vaporization of $LCO_2$ into the water in the enclosure, and hence increases $CO_2$ concentration, without lowering the temperature of the water being treated so far as to cause unwanted hydrate to form generally within the water mass. (Admittedly, balancing concentration and temperature by using seawater of different temperatures may ultimately prove difficult, and even though concentration may be raised in this manner, it ultimately may not be raised enough or sufficiently regularly to provide for a continuous desalination process.) Alternatively, instead of using all liquid $CO_2$, some gaseous $CO_2$, which when dissolved does not produce the same level of chilling as vaporization of $LCO_2$, may be mixed with the chilled water within the enclosure (with due regard for the energy balance of simple dissolution from the gas phase).

Furthermore regarding maintaining conditions for hydrate growth, detailed and on-going monitoring of local oceanography in the vicinity of the desalination installation should be conducted using standard oceanographic instrumentation and techniques so that any balance between infusing $LCO_2$ and dissolving gaseous $CO_2$ can be managed in order to keep water temperature within the enclosure in a desired narrow range, i.e., at about Position B in FIG. 20. Such monitoring is particularly important if water having different temperatures and/or drawn from different depths is used as part of the inventive process, since these variable temperature measurements provide the basic control data and input data for the operational algorithms used to control the desalination process of the invention. Additionally, diagrams similar to FIG. 20 must be generated for each installation location so that the particular depth of the installation and the temperature of the water at that depth (or other depths where water intakes are to be located) can be taken into account for determining refrigeration requirements of the water to be treated.

Turning now to a somewhat more macroscopic discussion, according to the invention, seawater is brought into an enclosure 8 (or pressure vessel), where it is charged with HFM while its temperature is reduced to near the point that hydrate is stable at the given pressure depth (as explained above). Infusion of the HFM into the source water, with its resulting vaporization and concomitant chilling of the seawater, is carried out entirely within the enclosure (or pressure vessel). Furthermore, according to the invention, the seawater within the enclosure may be subjected to either continuous or periodic infusion of HFM (but on a continuous basis) so as to keep HFM concentration high enough to permit hydrate to crystallize. As hydrate grows on the porous restraint panels and the water contained in the hydrate (i.e., the captured water) is extracted through the restraint panels and into the chambers 319 in the HART modules, more seawater may be brought into the enclosure, where it mixes with residual enhanced-salinity seawater (brine) remaining in the enclosure while it (the replacement seawater) is being charged with HFM. In one mode of operation according to the invention, it is intended that hydrate be grown until the salinity of the residual seawater within the enclosure increases to a target level, which target level is determined by a number of factors that are described in more detail below; at that point, all of the water within the enclosure may be allowed to exit from the enclosure so as to be replaced by new ambient seawater from immediately outside the enclosure. Alternatively, in another mode of operation according to the invention, additional water to be treated may be introduced into the enclosure on a generally continuous basis (either intermittently at a steady rate or constantly) and residual brine is evacuated from the enclosure generally at the same time, i.e., without allowing residual salinity within the enclosure to rise to a level that is too high. Thus, infusion of HFM into the water being treated and its incorporation into hydrate are generally continuous processes, whereas refreshing the water to be treated in the enclosure and evacuating the enclosure may be either batch or continuous processes.

As hydrate grows on the restraint panels and extracts fresh water from the source seawater, the salinity of the residual water (brine) within the enclosure increases. Additionally, the residual water will be colder than the surrounding ambient seawater. Therefore, the density of the residual water within the enclosure will be greater than the density of the surrounding ambient water so that when it (the residual water) is released from the enclosure 8 essentially as a bolus, the residual water will automatically sink downward and away from the enclosure. This natural movement of the residual water away from the enclosure removes the more saline water from the location of the desalination operation, into the lower open ocean depths and away from the surface where it could otherwise have a larger impact on the marine biosphere. (To facilitate delivery of the residual water to depth, it may be advantageous to exhaust the residual water from a pipe (not shown) extending downwardly from the desalination apparatus.)

As the residual water sinks, it mixes slightly with normal seawater, which mitigates the higher salinity and the lower pH of the residual water caused by high levels of HFM ($CO_2$) dissolved in it. Additionally, as the bolus of residual water sinks, pressure on it increases and the relative level of saturation with HFM ($CO_2$) decreases. Therefore, the residual water becomes undersaturated with $CO_2$ as it sinks so that environmental effects of the initially high saturation decrease with increasing depth.

(This dynamic removes $CO_2$ from the near-surface environment, in which it has been used for desalination/water purification, and sequesters it in the lower ocean depths. As the bolus of residual water continues to sink, pressure on it increases and temperature decreases. Therefore, $CO_2$ hydrate may form in the residual water. Formation of $CO_2$ hydrate will further increase the overall density of the residual seawater mass and expedite sinking of $CO_2$ toward the seafloor because $CO_2$ hydrate is negatively buoyant. Thus, in addition to providing desalination/purification of water, the invention provides an elegant means by which carbon dioxide may be sequestered.)

With regard to providing $LCO_2$ to the enclosure 8 for operation of the invention, there should be little, if any, energy cost required to pump the $LCO_2$ to the depths at which the system will be operating. In particular, the pressure in the holding tank (e.g., 32, FIG. 1) will be the vapor pressure of carbon dioxide at the temperature where the vessel is stored. The pressure at the bottom of the supply line to the enclosure (e.g., 36, FIG. 1) will be equal to the vapor pressure in the storage tank plus the head pressure caused by the weight of the $LCO_2$ in the delivery pipe. That pressure will, in most cases, be higher than the water pressure at depth. Therefore, the liquid carbon dioxide can be delivered to the hydrate-forming region in the enclosure 8 simply by opening a valve. (For liquefied HFM other than $LCO_2$, which may not have similar vapor pressure, it may be necessary to pump the HFM from a storage vessel on the surface to the enclosure.)

Once the $LCO_2$ reaches the enclosure 8, there are two approaches to infusing it into the water being treated according to the invention. In a single compartment enclosure, $LCO_2$ infusion, mixing, and hydrate growth all occur within a single compartment. In a multiple compartment enclosure, in contrast, infusion and mixing take place in one chamber, while the hydrate is grown in a separate, principal chamber that houses an array of HART modules. In either type of enclosure, infusion can be relatively turbulent, which promotes rapid dissolution of the $LCO_2$ into the water being treated.

FIG. 21*a* illustrates a single-compartment embodiment of an enclosure 8 in which $LCO_2$ 502 is introduced through a manifold 505 that equally distributes it to injectors 514 located between the HART modules 301. All operating apparatus is contained within the single compartment of the enclosure. $LCO_2$ injection is controlled by a variable valve 516, which responds to electronic control apparatus and built-in sensors (not shown). Because $LCO_2$ injectors can become clogged with $CO_2$ hydrate (or even water ice if located outside of the $CO_2$ hydrate stability zone), it is recommended that the $LCO_2$ be injected by a manifold at a sufficient number of injection points that the chilling potential of the $LCO_2$ vaporization is not over-concentrated at too small a number of injectors. In this embodiment, source seawater 530 is taken into the enclosure generally in the upper part of the enclosure, and enhanced-salinity residual water 535 is generally expelled from the lower part of the enclosure.

In this embodiment of the invention, source water that is untreated except for charging with $LCO_2$ provides the media for hydrate formation. Water extraction take place through the porous restraints of the HART modules until the salinity of the residual water in the enclosure reaches a desired level (for instance, twice normal salinities, or about 64,000 ppm). At this point, source water may entirely replace the treated water within the enclosure until near-normal salinity seawater one again occupies the entirety of the enclosure. Alternatively, intake of new source water can be slower and essentially replace only that water extracted through hydrate formation. This mode of operation will keep the water being treated within the enclosure relatively saline but will keep supersaturation at a nearly constant level over time. In either case, the $CO_2$ saturation of the water under treatment within the enclosure is maintained at high enough levels so that significant dissolution of hydrate on the porous restraints does not occur.

Alternatively, FIG. 21b illustrates a multiple-compartment embodiment of an enclosure, in which embodiment $LCO_2$ is infused into water being treated in chambers 610 that are separate from the principal desalination chamber 612, which contains the HART modules 301. After infusion in the chambers 610, the $CO_2$-infused water is injected into the principal chamber region 612, where $CO_2$ hydrate is grown. Infusion chambers 610 may be provided on all four sides of a rectilinear multiple-compartment enclosure. Alternatively, if the enclosure 8 is rounded or oval, infusion chambers may be provided around the entire periphery of the chamber 612. Still further, the infusion chambers 610 may be completely separate from the enclosure 8 holding the array of HART modules. The preferred configuration, however, is as shown in FIG. 21b.

In this embodiment, source seawater 630 is brought into the infusion chambers 610 by inlet pumps 632, and $LCO_2$ 502 is brought into the infusion chambers 610 and infused into the water being treated by manifolds 614 carrying a multitude of injectors. Provision may also be made for a trickle of un-infused water to be brought into the upper part of the enclosure 641 so as to balance pressure within and on the outside of the enclosure. Water movement within the multiple-chamber enclosure may be controlled by circulation pumps 637, which withdraw water from a collection manifold 639 in the primary desalination chamber 612 and impel it into the lower part of the infusion chambers 610. (Small arrows indicate the general direction of water movement in the chambers of the enclosure.) The circulation pumps 637 are provided only in part to impel the water within the enclosure, since the infusion process itself, which causes tiny gas bubbles to develop, will cause the water within the chambers 610 to rise. Therefore, the circulation pumps' primary function is to control the direction of flow in addition to causing flow, since in alternate modes of operation (which might promote better mixing of water and HFM), the circulation pattern could be reversed.

An infused-seawater manifold 645 injects the cooled water—which has been infused with HFM to appropriate levels of saturation—into the array of HART modules 301 through a system of injectors 649 so that hydrate forms in the pores of the restraint panels of the HART modules. Conditions between the HART modules 301 in a multiple-chamber enclosure are different from those in a single-chamber enclosure. In particular, whereas mixing conditions within the one chamber of a single-chamber enclosure are extreme because of the direct injection of $LCO_2$ into the water being treated, mixing conditions in the primary desalination chamber 612 of a multiple-chamber enclosure are much less turbulent, and water flow and water flow rates can be maintained as generally continuously downward. When the residual water within the principal chamber 612 of the enclosure has reached its desired salinity, it is expelled 535 generally from the lower part of the enclosure so that it can sink away from the enclosure. With this particular configuration of the enclosure, the seawater may be circulated through the infusion chambers and the primary desalination chamber 612 several times in order to reach the desired level of salinity and to utilize as much HFM as possible prior to expelling the increased-salinity water. This enhances efficiency of the inventive process.

More specific growth and dissociation dynamics will now be described. In particular, fabricating the porous restraint panels in two or more sections allows the tapered pores to have complex shapes—e.g., bi-cone shapes, as noted above—that dramatically improve the hydrate formation and dissociation process as compared to that which is possible with a simple conical profile as per my previous patents. FIG. 22a illustrates an ideal case of hydrate formation in the upper section 353 of a bi-cone composite porous restraint panel, with hydrate 765 growing in the pores on the upstream side of the composite restraint panel. Tapered pores 714 in the upper panel section 351 generally have conical cross-sections, with wide mouths 717. (See, also, FIGS. 12a and 12b.) These pores in the upper panel section provide the hydrate formation region in which hydrate growth is promoted. The lower, outlet ends 723 of the tapered pores of the upper section 351 of the porous restraint panel are smaller than their mouths 717. In the lower restraint panel section 353, a similar geometric relationship of the shape and disposition of the tapered pores exists in that the mouths 729 of the pores 731 in the lower panel section are larger than their necked exits 779. Significantly, the diameter of the exits or outlets of the upper section tapered pores is smaller than the diameter of the mouths of the lower section tapered pores. This provides the stepped or non-monotonically decreasing profile that may be considered characteristic of a bi-cone profile. The relative proportions of the diameters of the two ends of the tapered pores in the upper restraint panel section may vary, as may the ratio of the lengths of the longitudinal axes of the tapered pores.

FIG. 22b illustrates an alternate embodiment in which the pores of the lower restraint panel section 353 have larger volumes than in the embodiment illustrated in FIG. 22a. The larger volume aids dissociation of the hydrate, which dissociation is indicated schematically by the rough edges on the hydrate masses extending into the dissociation region 731 (i.e., the lower pores). The larger volume allows fragments of hydrate which may break off during the dissociation process to have additional space in which to reside, away from and out of contact with the main mass of hydrate 765. (This is beneficial as it further enlarges the surface area of hydrate and aids dissociation and more rapid water production.) In this example, a rectangular profile of the lower pores is illustrated, but the actual shape may vary considerably depending on specific materials, fabrication methods, etc. that are employed. The larger pore size in the lower restraint panel section facilitates better separation of the water and gas following dissociation of the hydrate, and it permits more pore drain holes 780 to be provided to facilitate passage of the water and gas into the internal HART module chamber 319. Furthermore, laterally spaced pore drain holes 780 as shown in FIG. 22b are advantageous when the porous restraints panels are vertically oriented during operation of the HART apparatus since gas and water that have separated after hydrate dissociation will tend to drain better than if there is just a single, centrally located drain hole. Also, if there is more than one drain hole for each dissociation region (lower pore), blockage of one or even more than one drain hole (e.g., by the rare occurrence of debris or sediment trapped within the hydrate) is less likely to impede overall hydrate dissociation, gas/water separation, and production of purified water. Furthermore, in this embodiment, there is a larger refrigerant supply gallery 399, which aids distribution and overall chilling potential of the refrigerant.

Where seawater being treated passes slowly across the face of a porous restraint panel, a boundary layer in which lamellar flow occurs may form. The primary mechanism by means of which dissolved hydrate-forming reactants can cross through such a boundary layer from the seawater to the growing hydrate is diffusion, which may be an important factor that affects the rate of hydrate growth and purity depending on the boundary layer thickness. Therefore, the thinner the boundary layer, the shorter the distance over which diffusion can operate as a rate-controlling and purity-controlling phenomenon. Accordingly, it is desirable to create turbulent conditions on the face of the porous restraint panels that introduce micro-mixing and eliminate lamellar flow boundary layer conditions, which of keeps pumping costs low and hydrate growth kinetics relatively high. Turbulence caused by water movement in the vicinity of the hydrate growth fronts enhances both the supply of dissolved reactants—required for continued growth—to the hydrate and removal away from the hydrate of material (dissolved ions, sediment, etc.) that has been rejected by the hydrate.

Figure 23A:
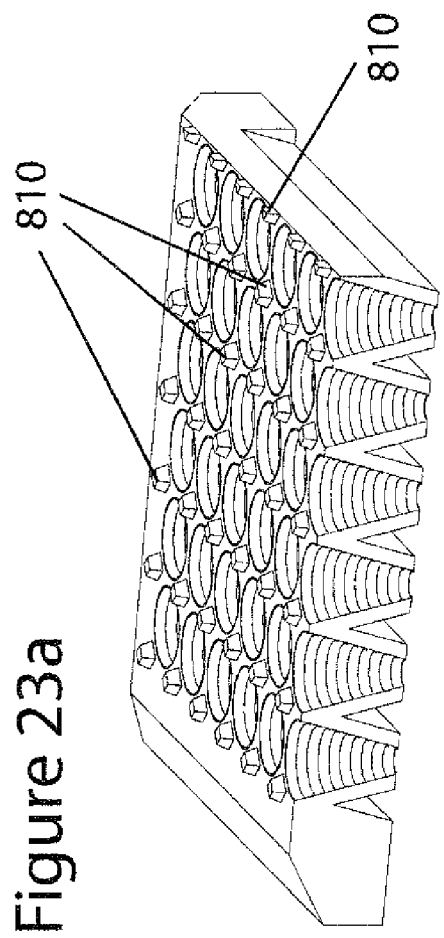
FIGS. 23a and 23b are schematic perspective views of portions of two different embodiment of porous HART restraint panels according to the invention, illustrating surface treatments to induce vortical flow across the panels.
Figure 23B:
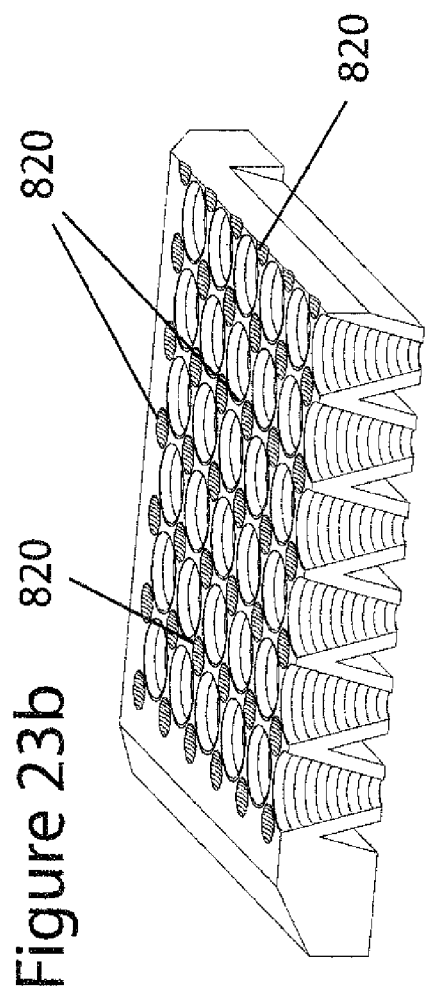

Turbulence and micro-mixing can be induced by micro-roughness on the exposed faces of the porous restraint panels. Such micro-roughness can be provided by several different means, each of which has the potential to induce rotational vortices. According to one embodiment illustrated in FIG. 23*a,* small protrusions 810 are formed between pores across the exposed surface of the upper restraint panel section, extending from that surface. Alternatively, as shown in FIG. 23*b,* small, similarly located dimples or impressions 820 can be formed in the exposed surface, which dimples 820 cause propagating vortices (which have an intrinsically better mixing effect) but may become filled with unwanted hydrate over time. Therefore, protrusions may prove to be more reliable flow-mixers over time, since they can be fabricated from material on which unwanted hydrate will not grow—the protrusions either being formed separately and attached to the upper restraint panel sections or being integral with the material from which the upper restraint panel sections are fabricated. However, any form of roughness element on the face of a porous restraint panel—possibly even a combination of protrusions and dimples or impressions—will be beneficial to hydrate growth.

Two additional considerations for optimizing practice of the invention are providing the correct heat extraction potential through the porous restraint panels (effectively heat exchangers) to the hydrate formation region and maintaining the correct concentration of dissolved HFM in the water being treated. Because water temperature within an enclosure 8 may vary depending on the temperature of the ambient seawater being brought into it, the relative proportion of infused liquid and gaseous HFM may vary. Ideally, temperature within the hydrate forming region (i.e., within the pores in the upper restraint panel sections) is maintained within a narrow range so that a constant level of HFM saturation in the water being treated yields a predictable growth dynamic.

Furthermore regarding practice of the invention, hydrate may be grown in either continuous or batch modes. In a continuous mode, hydrate growth and dissociation occur generally simultaneously, with hydrate growth at the growth front (i.e., at the outer surface of the hydrate masses within the pores of the upper restraint panel sections) generally matching hydrate dissociation within the pores in the lower restraint panel sections. The overall process can be described as continuous when the rate of hydrate growth is balanced by the rate of hydrate dissociation. In this case, the growth surface will appear to remain stationary, even though the constituents of the hydrate are moving through the pores of the restraint panels through a combined process of physical mass movement and migration of crystal constituents due to recrystallization of the hydrate. In a batch or cyclical mode of operation, in contrast, the rate of hydrate growth and dissociation rate are not at all times equal, so growth-dominant and dissociation-dominant periods (which may overlap to some extent) will exist. For continuous desalinated/purified water production, it is advantageous to establish as regular a period of cyclicity or continuity of growth as possible.

Figure 24:
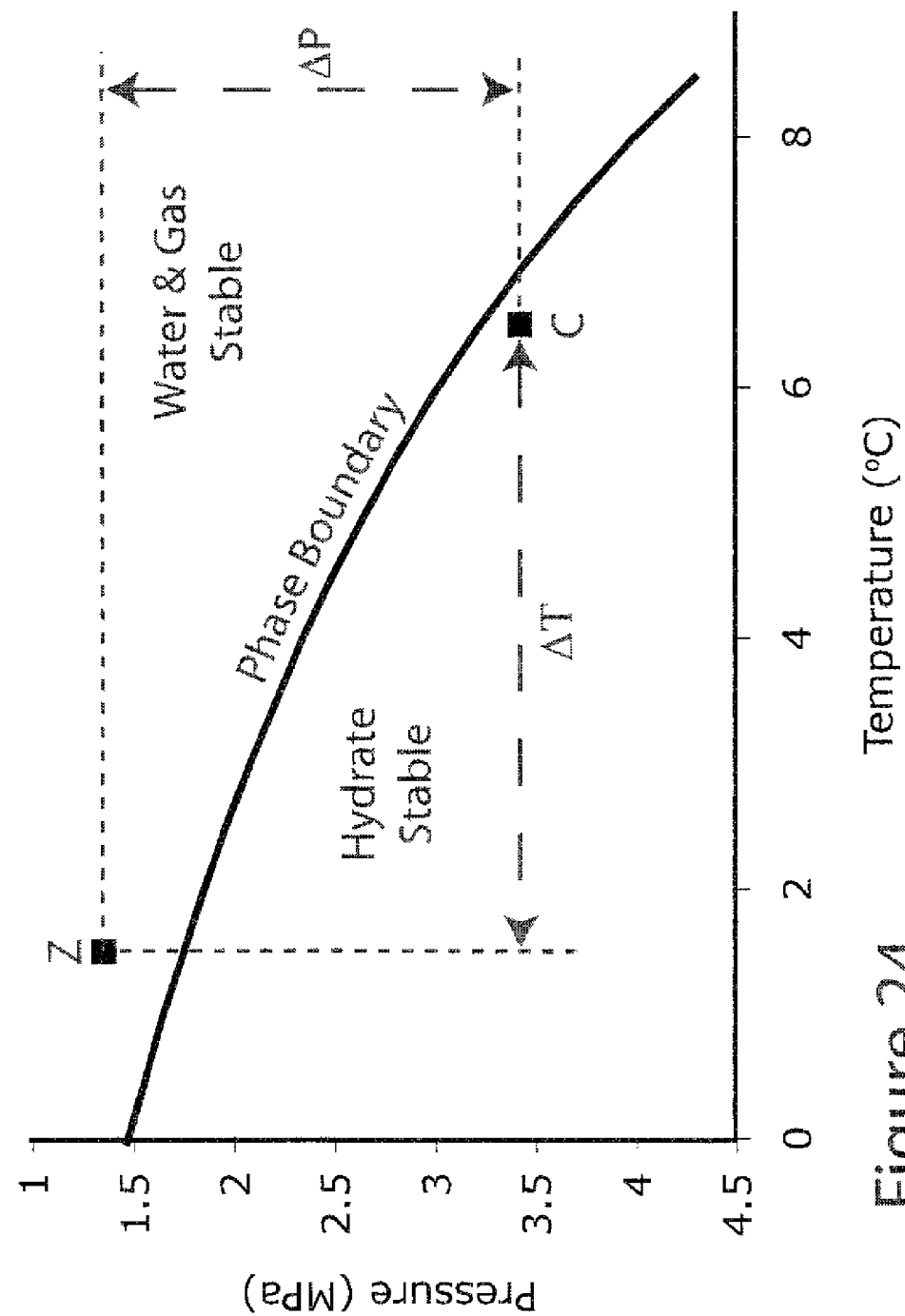
FIG. 24 is a plot, similar to that shown in FIG. 20, illustrating the dynamics of hydrate growth and dissociation according to the invention in pressure/temperature space.

Turning now to FIG. 24, location C on that figure is example of a pressure-temperature growth position for $CO_2$ hydrate that is just within the range of hydrate stability in a pressure/temperature field, which position is maintained within and at the surface of the growing hydrate at the mouths of the tapered pores in the upper restraint panel sections. (This position is equivalent to the growth position C for hydrate in FIG. 20.) The level or position of the growth position will vary with changing water pressure at different seawater depths, but the location of the growth position will remain about the same "distance" in pressure/temperature space from the phase boundary, in the metastable growth region of hydrate stability. An example of the position for dissociation of hydrate in the downstream end of each tapered pore on a pressure/temperature diagram (Z on FIG. 24), which is the same as the pressure in the inner chamber 319 of the HART modules 301, is colder than the growth position (C on FIG. 24) because the endothermic nature of the dissociation process consumes heat.

Figure 25:
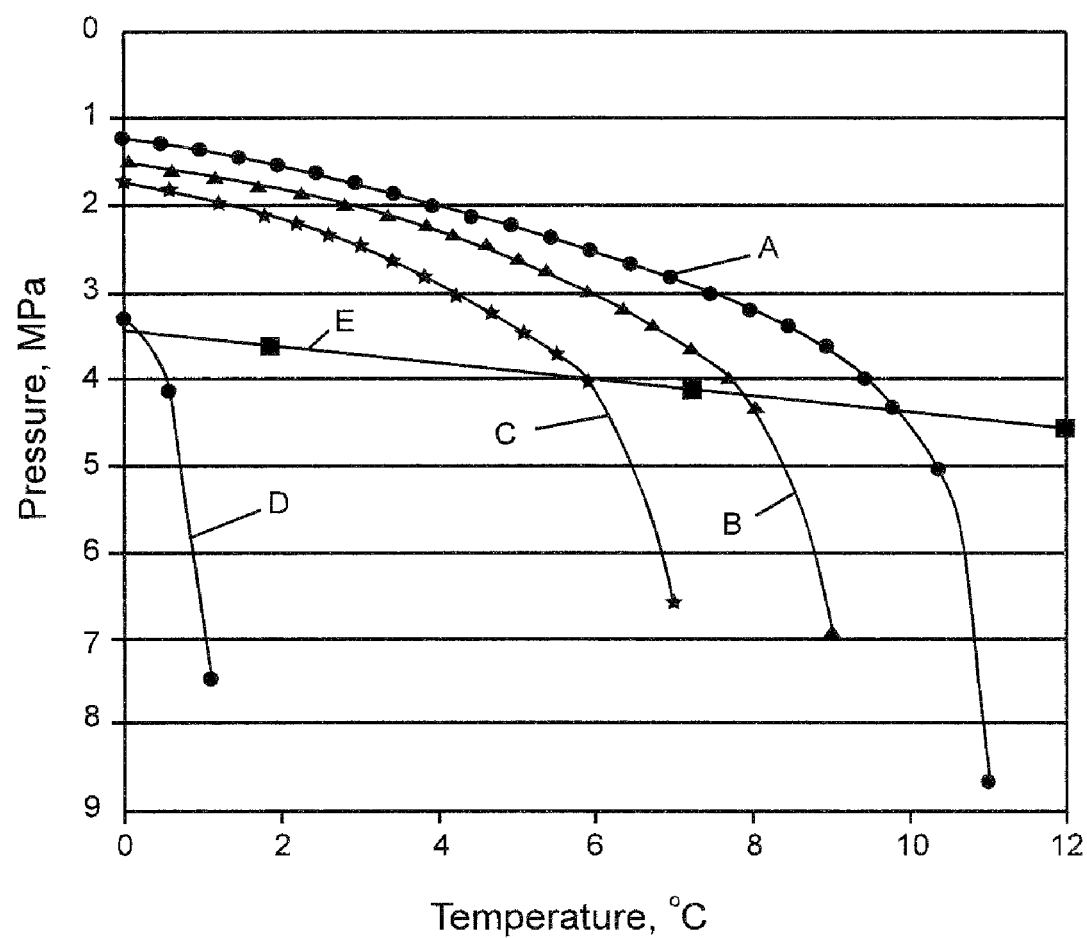
FIG. 25 is a plot illustrating the variation of the $CO_2$ hydrate phase boundary with ambient water salinity in pressure/temperature space.

The salinity of the seawater affects the position of the $CO_2$ hydrate phase boundary and, hence, the temperature at which hydrate will grow. Therefore, salinity should be monitored (e.g., via conductivity, etc.) during operation of the invention. As salinity in the enclosure changes during the desalination process as hydrate extracts water molecules from the source seawater, the temperature of the porous restraints must be lowered and the rate of $LCO_2$ infusion into the seawater adjusted so as to maintain an appropriate temperature for hydrate growth. In this regard and to demonstrate this effect, FIG. 25 illustrates phase boundaries that have been calculated for different water salinities. The different phase boundaries depicted are for A, fresh water at zero wt. % NaCl; B, average seawater at 3.4 wt % NaCl; C, super-saline water at 6.7 wt % NaCl; and D, hyper-saline water at 15 wt % NaCl. In addition to the hydrate phase boundaries, the carbon dioxide liquid/gas transition (the liquidus) is shown as line E, since the pressure/temperature conditions within the enclosure should be maintained so that gas rather than liquid remains the stable free-phase form of $CO_2$.

A temperature drop is required to continuously produce $CO_2$ hydrate in the porous restraint panels. The difference between the temperature of the water being treated generally within the enclosure and the temperature of the water at the surface of the hydrate/seawater interface is maintained at about 2° C. If salinity were to rise to a hyper-saline level (represented by line D in FIG. 25), however, considerably more refrigeration would be required to maintain such conditions Therefore, it is recommended that for each "batch" of seawater being processed, desalination only be conducted until salinity within the enclosure reaches a level that is slightly more than twice natural seawater salinity. Thus, where ambient salinity is relatively low—e.g., in ocean water that has been naturally diluted by fresh water, such as may be found in large estuaries or adjacent to land that has had recent high runoff of precipitation, where salinities may be as low as 26,000 ppm NaCl—proportionately more fresh water can be extracted from the seawater before such limits are reached. Conversely, in seawater having proportionately higher salinities—e.g., as is common in confined seas such as the Mediterranean and Red Sea, which have high evaporation (salinities as high as 48,000 ppm NaCl)—a proportionately lower percentage of fresh water may be obtained from the seawater before the cost of refrigeration becomes prohibitive.

Figure 26:
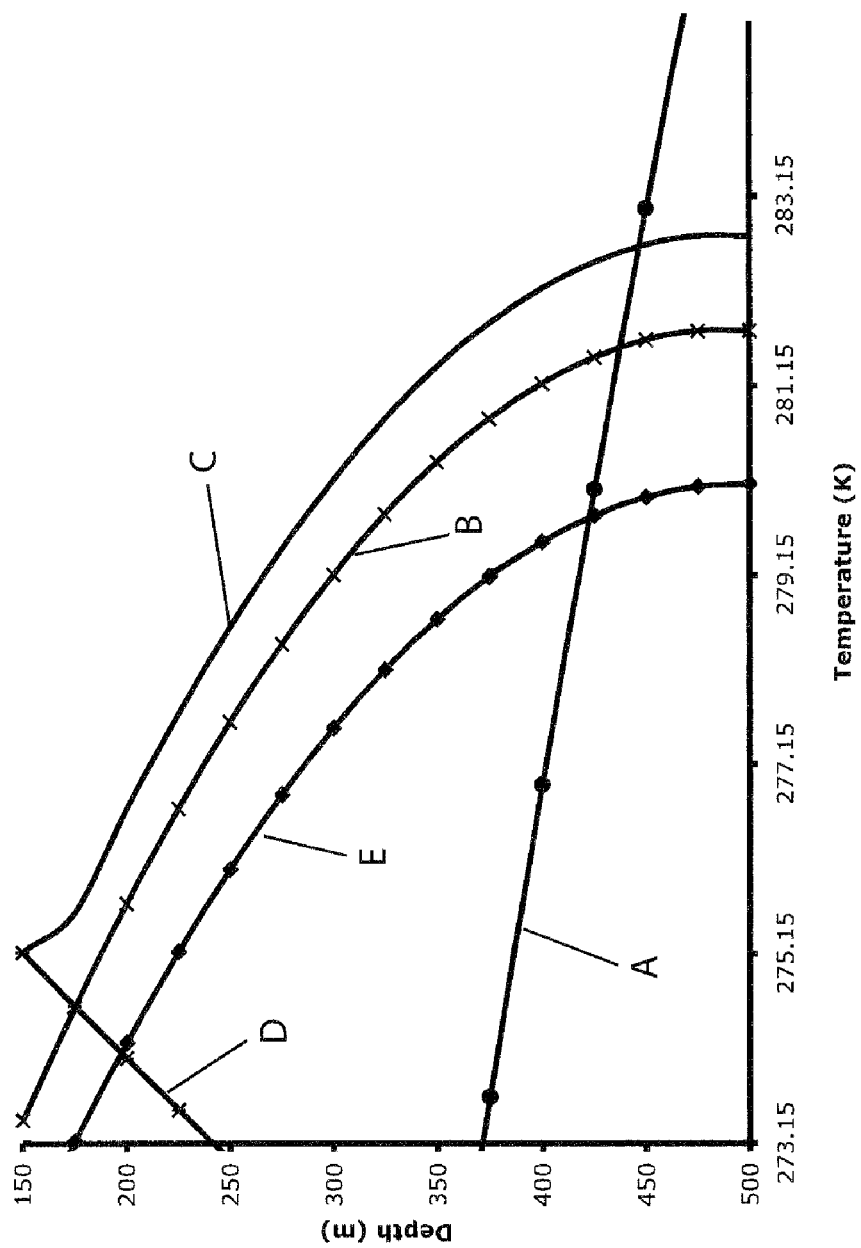
FIG. 26 is a plot illustrating the variation with depth (pressure) of the cooling potential obtained by vaporizing liquid HFM (liquid $CO_2$) in pressure/temperature space.

Another relationship that should be accounted for in practicing the invention is the relationship between depth (i.e., pressure) and the cooling effect of vaporizing $CO_2$, since that effect is pressure-dependent. Such relationship is illustrated in FIG. 26, in which A depicts the $CO_2$ liquidus (gaseous $CO_2$ above the liquidus; liquid $CO_2$ below it); B depicts the upper (i.e., low-pressure) limit for $CO_2$ hydrate formation; C depicts the temperature of water being treated within the enclosure obtained by vaporizing a portion of $LCO_2$ of about 1° C. above the phase boundary (this will vary with pressure-depth); D depicts the practical upper limit of cooling vaporization obtained by vaporizing 100% of the $LCO_2$ required to reach a dissolved $CO_2$ concentration required for hydrate formation (corresponding to position C on FIGS. 20 and 24); and E depicts the phase boundary for brine after removing 50% (by volume) of pure water from seawater.

Figure 27:
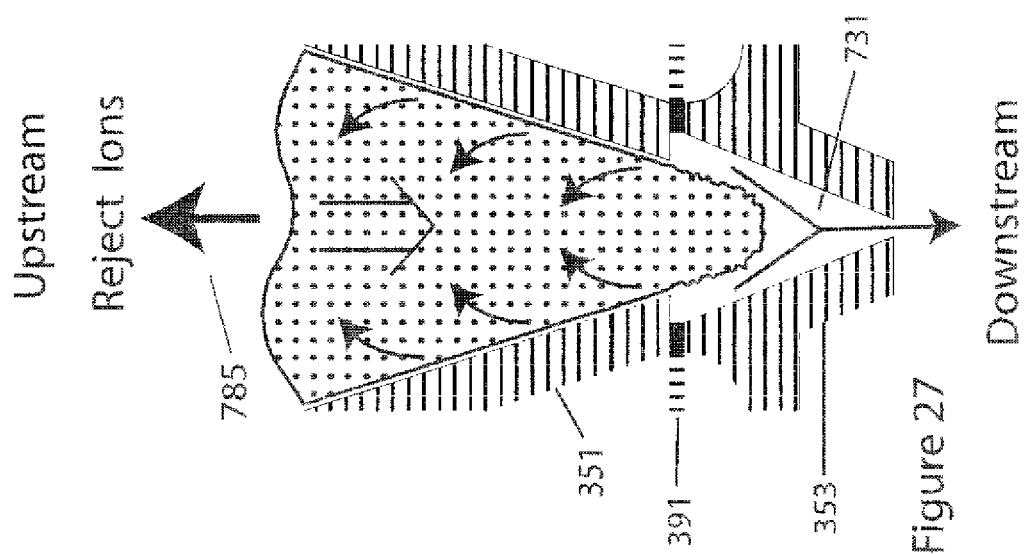
FIG. 27 is a schematic, detailed section view of a single pore within a porous HART restraint panel according to the invention, illustrating hydrate crystal kinematics.

As alluded to above, hydrate constituents move continuously through the tapered pores during operation of the inventive process. FIG. 27 illustrates the manner in which this transfer occurs. When the tapered pores are essentially full of hydrate and pressure is lowered in the internal HART chamber 319, a pressure differential is created across the hydrate in each pore. Pressure in the dissociation regions of the tapered pores (i.e., within the pores in the lower restraint panel sections) is controlled by pumps, responding to sensors and computer controls, so that it (pressure) approximately reaches a point in pressure/temperature space that is outside of the field of hydrate stability (point Z, FIG. 24). Once pressure has been lowered on the downstream side of the tapered pores, the hydrate in each of the pores becomes subject to differential triaxial strain, which induced strain is beneficial to the overall process of water production and to the purity of the converted water. The differential pressure physically pushes the hydrate against the tapered pore walls, and the resultant strain—indicated in FIG. 27 by schematic strain vector arrows (curved single-stem arrows within the hydrate—within the hydrate plugs (dotted) causes the hydrate to recrystalize through grain boundary migration and defect and dislocation migration. Thus, Annealing recrystallization conditions are induced by the strain. Where stress within the hydrate is high enough to cause fractures, the fractures are transpressional with respect to the tapered pore sidewalls and thus self-sealing. Although some of the hydrate in each pore—generally in the central area and increasingly toward the necked-down pore exits—will move en masse, much of the hydrate—especially near the pore walls, where strains are greates—will exhibit mass transport through recrystallization. Thus, mass transfer of the water and gas constituents of the hydrate results from solution migration and diffusion down-pressure gradients, from the upstream side of the porous restraint panels to the downstream side.

Annealing recrystallization purifies the aggregate of hydrate crystals in each tapered pore. Varying temperature within pores will accelerate recrystallization. Impurities such as salt ions are displaced toward the front of hydrate growth at the mouths of the tapered pores (which is the margin of the low pressure gradient in the hydrate), from which growth front diffusion processes will tend to drive them back (arrow 785) into the residual seawater. Moreover, the natural tendency in an aggregate of crystals is for "survivor" crystals, which are either larger or more stable, to grow at the expense of smaller or less stable "donor" crystals having higher surface energies. This process minimizes energy in the hydrate by reducing intercrystalline defects and dislocations and intercrystalline grain boundary area in the mass of hydrate. Triaxial strain induced in the hydrate in the tapered pores enhances this tendency and thus aids the hydrate purification process.

The general direction of movement of the hydrate is indicated by the double-stemmed arrow in FIG. 27. As a result of this mass transfer—by mass movement, ductile flow, or recrystallization processes, all caused by triaxial differential stress having the axis of maximum stress approximately parallel to the longitudinal axes of the tapered pores—hydrate is essentially extruded through the lower outlet ends 723 of the pores in the upper restraint panel sections (i.e., hydrate formation regions) into the pores 731 in the lower restraint panel sections (i.e., the dissociation region).

Figure 22:
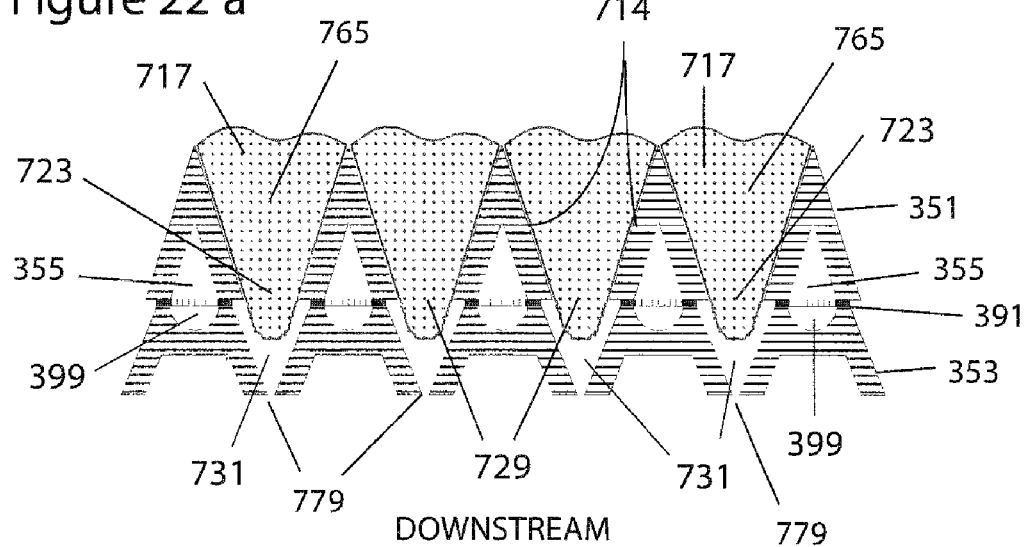
FIGS. 22a and 22b are schematic, detailed section views of two different embodiments of porous HART restraint panels according to the invention, illustrating the growth of hydrate in the pores thereof.
Figure 22:
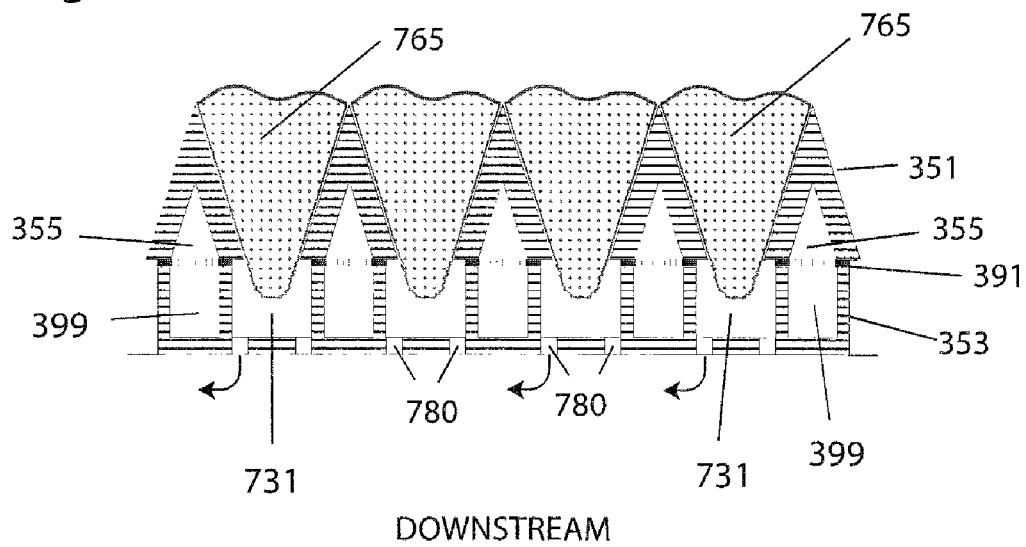

Because dissociation is a diffusional surface phenomena, the larger the surface area of hydrate which is exposed to lower pressure, the faster dissociation of the hydrate mass can take place. The bi-cone or bi-part geometry of the pores (FIGS. 4, 12, 22a, 22b, and 27) increases the conversion of water and gas from the solid hydrate to liquid water and gas over that which would be produced from tapered pores having a simple conical form in which only a relatively small area of hydrate at the narrow opening 779 of the tapered pore would be subject to low pressure. Because the conical tapered pore in the lower section is of greater diameter than the hydrate that is being pushed into it, considerable surface area of the hydrate plugs is exposed to the low-pressure region where it is unstable. FIGS. 22 and 27 show idealized hydrate extrusions into the larger diameter dissociation region of the tapered pores. Hydrate may essentially maintain its conical form as it is forced into the hydrate dissociation region 731 (FIGS. 12, 22a, 22b, and 27). As the hydrate is progressively lower in the dissociation region, it is shown as being increasingly narrow owing to a longer time under dissociation conditions.

In certain cases where the starting water temperature is low enough (for instance, 15° C. or less), it may be necessary to infuse gaseous $CO_2$ instead of liquid $CO_2$ into the water being treated to avoid overcooling the water to below the desired temperature (for example, Point B of FIG. 20). In that case, gaseous $CO_2$ that has been recovered from the dissociation of hydrate and/or from the porous restraint refrigeration system is dissolved into the water being treated. Reusing as much gaseous $CO_2$ recovered from every cycle of hydrate formation and dissociation and from the porous restraint refrigeration system is advantageous, and it is desired for the same gaseous $CO_2$ to be dissolved in the enclosed water being treated over and over again. The primary limit to the number of times a given volume of $CO_2$ may be used is the salinity of the residual seawater (brine) that results from hydrate formation and growth. In particular, at some point the enhanced-salinity residual water has to be exhausted from the enclosure 8, as explained above, and $CO_2$ that remains dissolved in that exhausted water will be lost.

The amount of $LCO_2$ required to cool the water being treated by infusion from its initial ambient temperature (e.g., Point A on FIG. 20, or about 15° C.) to the desired temperature (e.g., Point B on FIG. 20) may not dissolve enough $CO_2$ into the water being treated to reach the levels of supersaturation required for hydrate to form. However, simply infusing more $LCO_2$ into the water being treated to reach the required levels of supersaturation may cause the temperature in the enclosure 8 to drop too much, which can undesirably cause hydrate to form generally throughout the water being treated, away from the porous restraint panels. Therefore, to obtain the levels of supersaturation required for hydrate to grow, additional $CO_2$ must be dissolved into the water being treated within the enclosure 8, but without causing temperature of the water being treated to fall too much. Infusing "supplemental" gaseous $CO_2$ into the water being treated instead of liquid $CO_2$ enables one to meet that requirement.

Figure 28:
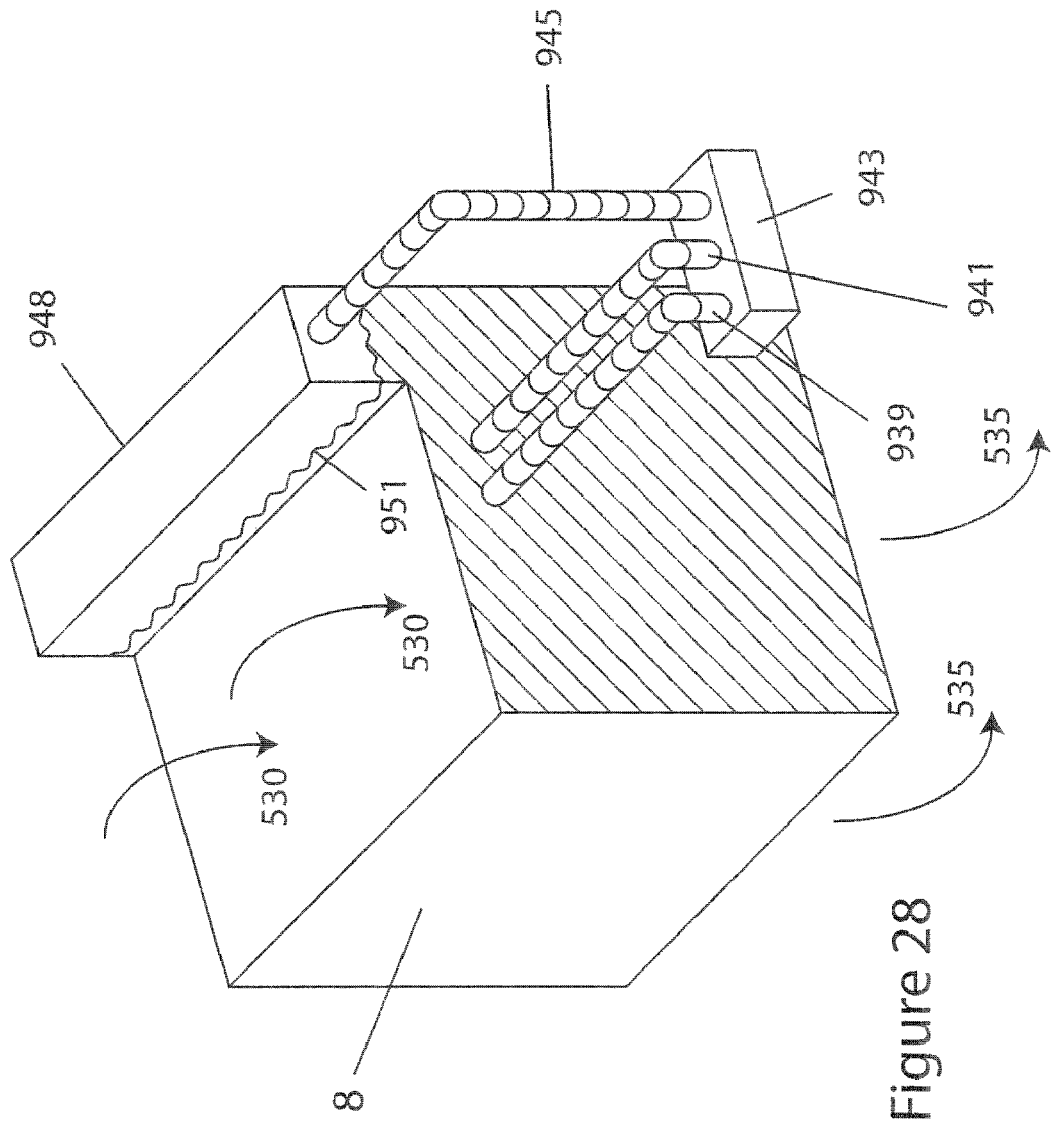
FIG. 28 is a schematic perspective view of another embodiment of apparatus according to the invention.
Figure 29:
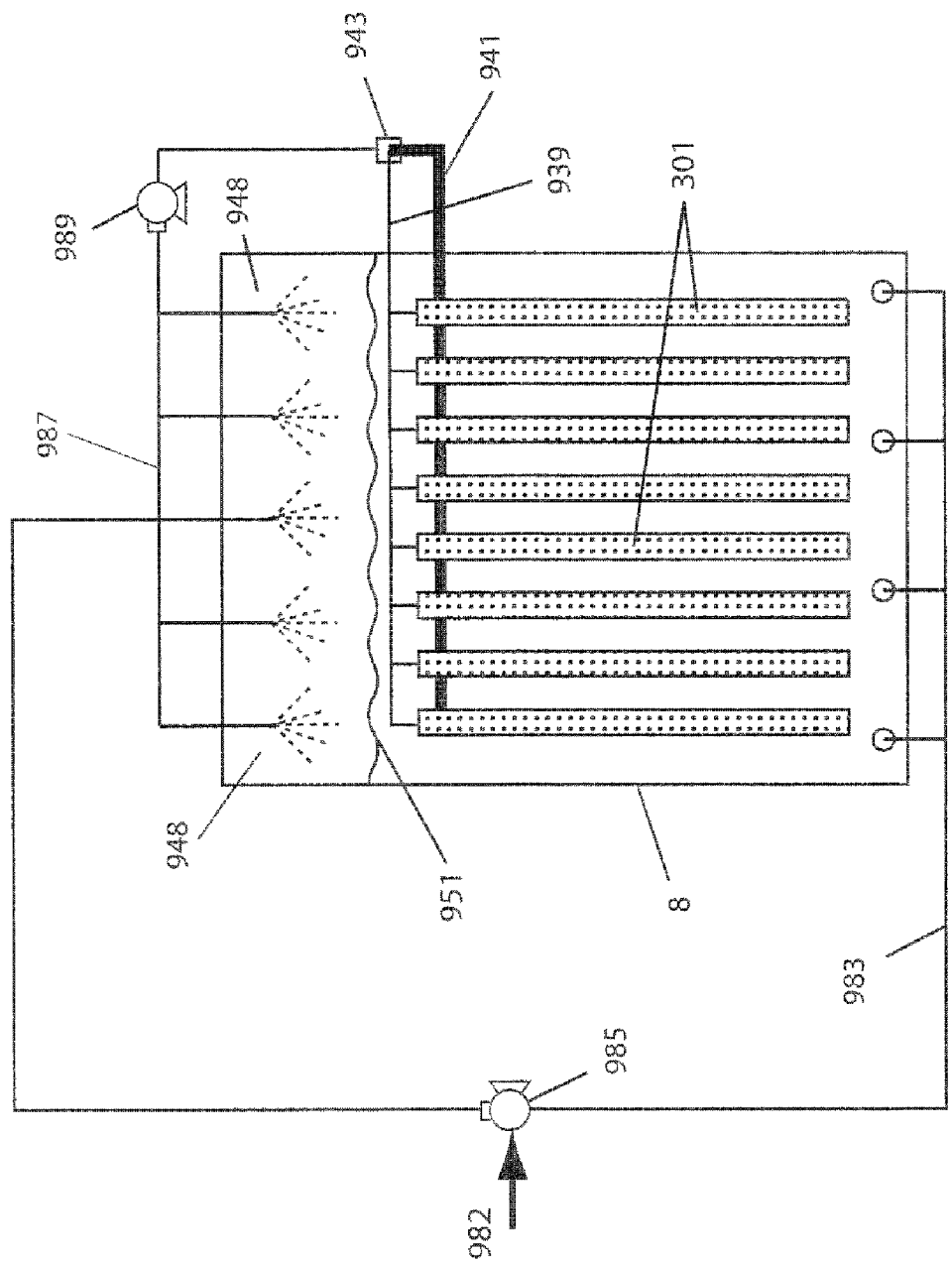
FIG. 29 is a schematic section view of the apparatus illustrated in FIG. 28.

FIGS. 28 and 29 illustrate a setup with which gaseous $CO_2$ from the dissociated hydrate 939 and/or from the refrigeration system 941—preferably from both—can be captured and reintroduced (i.e., dissolved into) water being treated. Pressures in the two systems are equalized, and the combined $CO_2$ is mixed in a pump assembly 943. The gas is then pumped 945 into a gas-dissolving region 948 of the enclosure 8—also referred to as a "gas trap"—in which the water level 951 is kept higher than the water level in the rest of the otherwise completely flooded enclosure 8. It should be understood that the gas trap concept and function may be implemented in a variety of forms other than that specifically illustrated. Further, the gas trap may be implemented in a separate vessel with a connecting piping system (not shown).

As illustrated in FIG. 29, seawater circulated from the enclosure can be sprayed or misted into a chamber (e.g., the gas trap 948) containing $CO_2$. Water is circulated from the enclosure 8 through conduit 983 via a pumping system 985 to sprayers in the gas trap 948, as is $CO_2$ recovered from dissociated hydrate (939) and from the permeable restraint panel refrigeration system. A pump 989 on the reused $CO_2$ system may supplement the pump system in which more than one $CO_2$ stream is equalized. Recirculated water is distributed via an injection manifold 987, from which it is injected into the gas in the gas trap 948 through a sprayer system having clog-free nozzles, a number of which are commercially available. (For example, SpiralJet spray nozzles (Spraying Systems Co, 2005) are commonly used to dissolve gases in various fluids to levels of supersaturation much more effectively than bubbling gas through water.) Some ambient seawater 982 may also be introduced into the manifold injection system 987 to replace or compensate for water that has been extracted by the process of hydrate formation and dissolution, or it may be introduced by means of a completely separate system.

Figure 30:
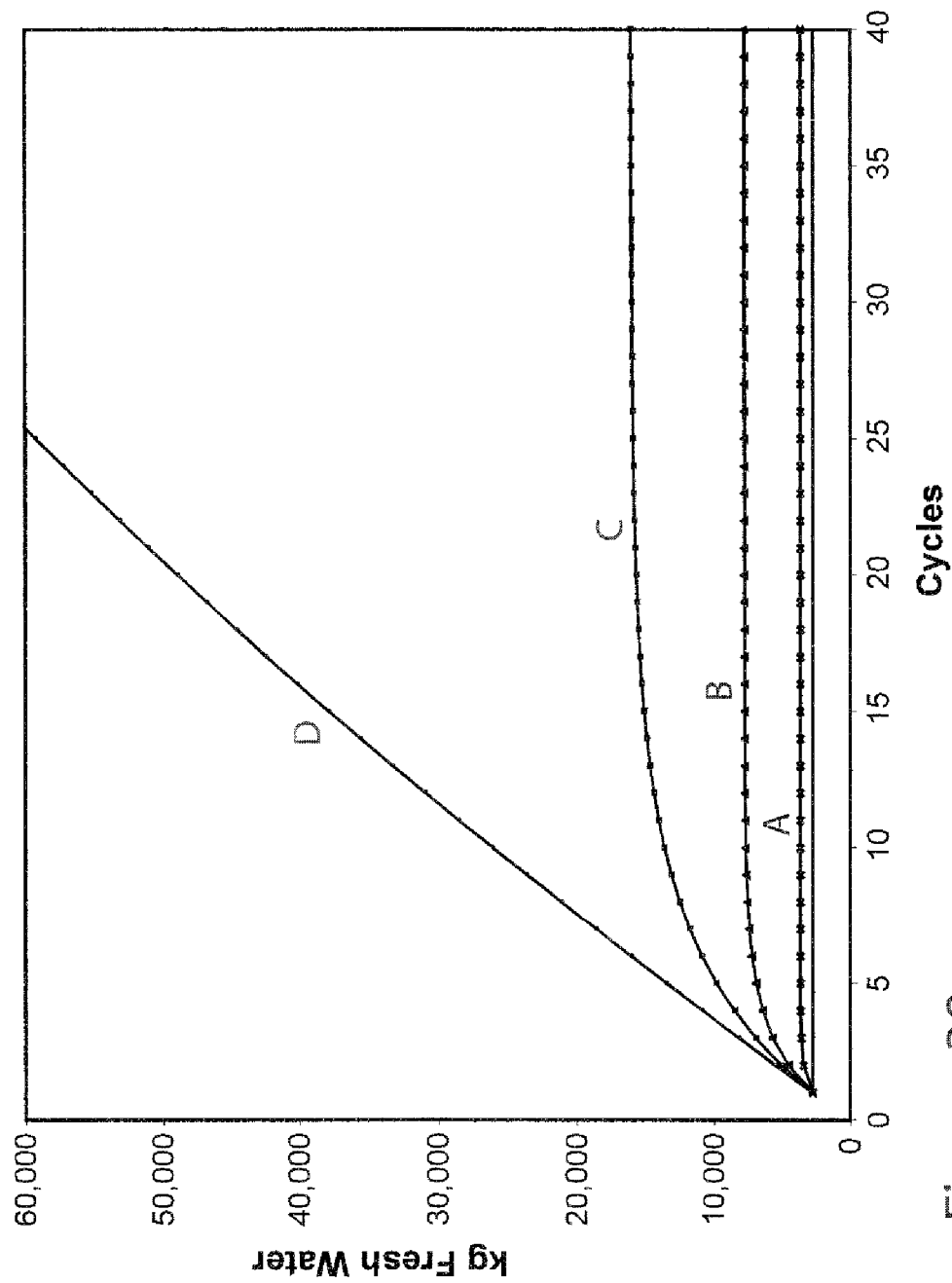
FIG. 30 is a plot illustrating the variation of fresh water that can be recovered by practicing the invention with different amounts of HFM recycling.

Reusing $CO_2$ that has been recovered from the refrigeration and hydrate-to-water conversion systems allows a maximum amount of recovered water to be produced from a given volume of $LCO_2$ supplied to the desalination apparatus. Calculations indicate that with a system that allows for multiple cycles of $CO_2$ recovery and reuse, up to about 15,000 kg of water can be produced for every 1,000 kg of $LCO_2$ that is originally supplied to the desalination enclosure (FIG. 30). This yield has been calculated by assuming that the only loss of $CO_2$ from the system is that which occurs when enhanced salinity residual water is released from the enclosure. In practice, however, there will be small, non-systematic losses. The calculations also take into account dissolved $CO_2$ remaining in the produced water, calculated over time during multiple hydrate formation cycles for an ambient temperature of 15° C. and until salinity of the residual brine within the enclosure 8 doubles from about 34,000 ppm to 68,000 ppm (C on FIG. 25). The actual mass ratio of desalinated water produced to initial $CO_2$ consumed will, of course, depend on the salinity of the source seawater; the salinity of the residual water at the time it is released from the enclosure; the ambient temperature of the seawater; and a host of other factors. As long as a normal range of oceanic conditions is encountered, however, this calculation should be accurate enough for large-scale estimation of water production capabilities.

Following dissociation of hydrate, recovered water will be saturated with dissolved $CO_2$, and gaseous $CO_2$ within the enclosure will be saturated with water vapor. Therefore, water/gas separation systems are recommended—first at the HART modules themselves and secondly at the surface facility 28 or 65 (FIGS. 1 and 2) to prepare the produced water for transport. Additional gas separation systems may also be provided at intermediate depths—i.e., between the desalination apparatus and the surface. The pressure of gas that is "drawn off" at these intermediate pressure depths will be between that encountered in the dissociation chambers 319 in the HART modules 301 and the ambient surface pressures at which the naturally carbonated produced water is kept. If it is desired to reuse $CO_2$ that evolves or exsolves from the produced water, the $CO_2$ will have to be recompressed either to higher-pressure gaseous $CO_2$ or to liquid $CO_2$ and redelivered to the enclosure 8 containing the desalination apparatus. Although this will require additional energy and incur additional expense, it will ensure that the $CO_2$ is not released directly into the atmosphere. However, operational economics might dictate that some of the $CO_2$ derived from the produced fresh water will have to be exhausted into the atmosphere (or processed in some way to prevent it) if the $CO_2$ is not reused for further desalination.

Operational energy costs associated with practicing the invention may be kept relatively low because system pressurization occurs naturally; the weight of the seawater itself at the depths chosen for each HFM provides suitable pressures for hydrate formation. Additionally, the HFM delivery system is largely self-pressurizing, so pumping the HFM ($LCO_2$) to depth is generally not required. The primary energy costs associated with practicing the invention are attributable to pumping water and $CO_2$ as part of the circulation systems described above in connection with FIGS. 28 and 29 and to recompressing the $CO_2$ for reinjection into the system. For the most energy-efficient operation possible, the cost of recompression can be minimized by maintaining the pressure of the downstream or water/gas recovery region within each HART module fairly close to the liquid/gas transition pressure for any particular temperature. Furthermore, $LCO_2$ vaporization may also be used to compress other gases or to drive hydraulically driven pumps. It is also possible to harness expanding gas in the fresh water production line (FIGS. 1 and 2) to yield considerable energy. A continuing energy cost is associated with pumping water from depth to the top of the water return pipe, which is determined by pressure in the internal chamber 319 of each HART module 301.

FIG. 30 illustrates the amount of water that can be produced using a $CO_2$/HART system as described herein for different levels of $CO_2$ reuse. Operating with the highest energy costs produces the highest yield of fresh water per carbon dioxide unit, while operating with the lowest amount of fresh water produced per unit of carbon dioxide used uses the least amount of energy. Depending on the number of times the $CO_2$ is reused, different costs are incurred. If $CO_2$ is not reused at all, energy requirements for the system, as shown by line A (FIG. 30)(0 kW hr/kgal produced for re-compression), involves no recompression of the gaseous $CO_2$. Although this operational approach requires no energy for recompression or pumping, it produces only 2.8 kilograms of water per kilogram of carbon dioxide used. (This might be acceptable if $CO_2$ were so inexpensive that it cost virtually nothing, or in a situation where, for example, sequestration and disposal of the $CO_2$ were more important than producing desalinated water.)

If a portion of the free gas evolved upon hydrate dissociation is recompressed and reused (in order to supplement the liquid carbon dioxide in raising $CO_2$ saturation levels in the water being treated), which operational approach is illustrated by line B in FIG. 30, the energy required remains fairly low while the fresh water production ratio (fresh water produced per unit of $CO_2$ used) increases. If, on the other hand, all of the carbon dioxide evolved from the hydrate (at the pressure of the gaseous $CO_2$) is recompressed and returned to the system for further hydrate formation, which operational approach is illustrated by line C in FIG. 30, water production again increases. This further increases energy costs slightly while increasing the overall water production ratio even more. Line D in FIG. 30 represents the maximum amount of water that can be produced per unit of carbon dioxide used, but with no regard for the cost of energy used to recompress the $CO_2$.

Other operational relate to disposal of carbon dioxide. When the produced fresh water is brought to the surface, carbon dioxide that evolves from it must either be collected and recompressed or released to the atmosphere. Capturing energy from the expanding gas coupled with carbon emission credits earned by disposing of the carbon dioxide with the residual brine (which sinks to depth, as addressed above) may make capture, reuse, and disposal of carbon dioxide gas evolved upon depressurization of the fresh water very economical.

The cost of $CO_2$ is a primary factor in the cost of the produced water, as it is the sole consumable used in the process. $LCO_2$ is one of the least expensive industrial gases, especially when purchased in bulk. Moreover, the cost of $LCO_2$ may decrease even further, as carbon dioxide has come to be regarded as the principal undesirable waste product from power generation in view of its negative impact on global climate change when freely exhausted into the atmosphere. Therefore, political imperatives indicate that considerable $LCO_2$ soon may be available as a cheap consumable to be disposed of in an environmentally acceptable manner (e.g., deep in the oceans, where it will not contribute to the atmospheric greenhouse effect). Furthermore, a system of monetizing $CO_2$ disposal already exists. Thus, where the $CO_2$-based marine desalination process is used to dispose of $CO_2$, there ultimately may be no cost at all for the only consumable used in the process. The portion of carbon dioxide recompressed during operation of the invention will be a function of the market value of liquid carbon dioxide, energy, and carbon emission credits. This will vary over time, and possibly from one location to another.

If a primary objective is to dispose of $CO_2$, the ratio of water produced to the amount of $CO_2$ used can be varied. For best water production, residual enhanced-salinity water within the enclosure is not exhausted until it has reached about twice normal seawater salinity. Conversely, if greater $CO_2$ disposal is required, the residual water may be exhausted more frequently, but at salinities that are only sufficiently increased relative to normal seawater to ensure that the water mass sinks to depth in the sea.

Finally, if the water being treated is treated within an artificially pressurized apparatus (i.e., an apparatus in which pressurization is not achieved by immersion in a body of water), no separate enclosure (other than the pressure vessel itself) will be required, as the conditions for hydrate growth are maintained within the vessel.

The foregoing disclosure is only intended to be exemplary of the methods and apparatus of the present invention. Departures from and modifications to the disclosed embodiments may occur to those having skill in the art. The scope of the invention is set forth in the following claims.

I claim:

1. Apparatus for desalinating or otherwise purifying water to be treated, said apparatus comprising:
    an enclosure having an inlet for the introduction of said water to be treated and one or more Hydrate Asymmetric Restraint Technology ("HART") modules disposed therein, each of said HART modules including one or more HART restraint panels formed as composite panels, with pores extending from one major surface of each restraint panel to an opposite major surface of each restraint panel, and an internal chamber formed therein, each of the HART restraint panels having a series of cooling galleries extending internally throughout it between the pores thereof;
    a first conduit arranged to supply hydrate-forming material to the enclosure; and
    a second conduit arranged to remove purified water from the internal chambers of the HART modules.

2. The apparatus of claim 1, wherein said enclosure is submersible and is configured to be placed in pressure-equalizing communication with ambient, sub-aquatic surroundings.

3. The apparatus of claim 1, wherein said enclosure comprises a pressure vessel.

4. The apparatus of claim 1, wherein the pores of the HART restraint panels taper non-monotonically.

5. The apparatus of claim 4, wherein the pores of the HART restraint panels have a bi-cone configuration.

6. The apparatus of claim 1, wherein the HART restraint panels comprise upper and lower restraint panel sections.

7. The apparatus of claim 6, wherein the HART restraint panels each comprise a refrigerant distribution member disposed between the upper and lower restraint panel sections.

8. The apparatus of claim 7, wherein the refrigerant distribution members comprise microporous regions disposed within the cooling galleries of the HART restraint panels and dividing the cooling galleries into two sub-galleries.

9. The apparatus of claim 7, wherein the refrigerant distribution members comprise regions with drilled holes on the order of about thirty to about eighty microns disposed within the cooling galleries of the HART restraint panels and dividing the cooling galleries into two sub-galleries.

* * * * *